(12) United States Patent
Ito

(10) Patent No.: US 8,736,873 B2
(45) Date of Patent: May 27, 2014

(54) INFORMATION PROCESSING APPARATUS, INFORMATION PROCESSING APPARATUS CONTROL METHOD, AND STORAGE MEDIUM

(75) Inventor: Yousuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 13/004,997

(22) Filed: Jan. 12, 2011

(65) Prior Publication Data

US 2011/0170135 A1 Jul. 14, 2011

(30) Foreign Application Priority Data

Jan. 14, 2010 (JP) ................................. 2010-005833

(51) Int. Cl.
*G06F 3/12* (2006.01)
*G06K 15/00* (2006.01)
*G06K 1/00* (2006.01)

(52) U.S. Cl.
USPC ......... 358/1.15; 358/1.13; 358/1.18; 358/1.9; 358/1.1

(58) Field of Classification Search
None
See application file for complete search history.

(56) References Cited

U.S. PATENT DOCUMENTS

| | | | |
|---|---|---|---|
| 7,375,842 B2 * | 5/2008 | Kloosterman et al. ....... | 358/1.18 |
| 2003/0189726 A1 | 10/2003 | Kloosterman | |
| 2006/0023238 A1 | 2/2006 | Blaszyk | |
| 2006/0158674 A1 * | 7/2006 | Mizoguchi .................... | 358/1.13 |
| 2008/0037047 A1 * | 2/2008 | Condon et al. ............... | 358/1.13 |
| 2011/0170135 A1 * | 7/2011 | Ito ................. | 358/1.15 |
| 2011/0170140 A1 * | 7/2011 | Naka et al. .................... | 358/1.16 |
| 2011/0181913 A1 * | 7/2011 | Yoshimura et al. .......... | 358/1.15 |
| 2012/0019856 A1 * | 1/2012 | Oshima ........................ | 358/1.15 |
| 2013/0016389 A1 * | 1/2013 | Robinson ..................... | 358/1.15 |
| 2013/0271777 A1 * | 10/2013 | Ito ................................. | 358/1.9 |

FOREIGN PATENT DOCUMENTS

| | | |
|---|---|---|
| CN | 101122845 A | 2/2008 |
| CN | 101324832 A | 12/2008 |
| EP | 1837752 A2 | 9/2007 |
| EP | 2003544 A2 | 12/2008 |
| JP | 2003-316548 A | 11/2003 |
| JP | 2003-316549 A | 11/2003 |
| JP | 2003-316549 A | 11/2003 |
| JP | 2007-287136 A | 11/2007 |
| KR | 10-2008-0109607 A | 12/2008 |

* cited by examiner

*Primary Examiner* — Satwant Singh
(74) *Attorney, Agent, or Firm* — Canon USA, Inc., IP Division

(57) ABSTRACT

A client personal computer having a hierarchical structure and processing a variable data printing (VDP) document to which metadata can be added includes a UI unit for receiving an instruction to mutually associate a layer of a template corresponding to the VDP document, a print setting editing unit for setting a print setting to the layer of the template according to the instruction, a job ticket output unit for outputting a job ticket including a correspondence relation between the print setting and the VDP document and the print setting, and a VDP job output unit for adding, to the print data, metadata for mutually associating the print setting described in the output job ticket and the layer of the VDP document corresponding to the layer of the template to which the print setting has been set.

18 Claims, 25 Drawing Sheets

FIG.5

| INTENT TYPE NAME | DESCRIPTION | PRINT SETTING CATEGORY |
|---|---|---|
| Common | COMMON TO INTENT | SHEET, PRINTING QUALITY, IMPOSITION METHOD |
| Envelope | ENVELOPE | SEALING METHOD |
| Label | LABEL | |
| Poster | POSTER | PRINTING QUALITY |
| Post Card | POST CARD | INCLUDES BAR CODES |
| News Paper | NEWS PAPER | FOLDING METHOD |
| Letter | LETTER | TRIMMING METHOD, FOLDING METHOD, BINDING METHOD |
| Book | BOOK | TRIMMING METHOD, FOLDING METHOD, BINDING METHOD (BOOKBINDING METHOD) |
| Booklet | BOOKLET | TRIMMING METHOD, FOLDING METHOD, BINDING METHOD |
| Brochure | BROCHURE | TRIMMING METHOD, FOLDING METHOD |
| Body | BODY | |
| Leaflet | LEAFLET | TRIMMING METHOD, FOLDING METHOD |
| Business Card | BUSINESS CARD | TRIMMING METHOD |
| Insert | INSERT | |
| Cover Letter | COVER LETTER | |
| Jacket | JACKET | FOLDING METHOD |

FIG.15A

```
...
<AAParams Class="Parameter" ID="IDAAP"
Status="Available" settingA="defaultValue"/>
...
```
1501

FIG.15B

```
...
<AAParams Class="Parameter" ID="IDAAP"
Status="Available" settingA="defaultValue"
PartIDKeys="Metadata0">
  <AAParams Metadata0="Pattern1" settingB="value1"/>
  <AAParams Metadata0="Pattern2" settingB="value2"/>
  <AAParams Metadata0="Pattern3" settingB="value3"/>
  <AAParams Metadata0="Else" settingB="value4"/>
<AAParams>
...
```
1502

FIG.15C

```
...
<RunList>
  <MetadataMap DataType="PartIDKeys=" Name="Metadata0"
    ValueFormat="%s" ValuerTemplate="pattern">
    <Expr Name="pattern" Value="Pattern1">
    <and>
      <NameEvaluation
        Path="PPML/JOB/METADATA/DATUM/@gender"
        RegExp="male"/>                                        1503
      <IntegerEvaluation
        Path="PPML/JOB/METADATA/DATUM/@age"
        ValueList="0~20"/>
    <and>
    </Expr>
    <Expr Name="pattern" Value="Pattern2">
    <and>
      <NameEvaluation
        Path="PPML/JOB/METADATA/DATUM/@gender"
        RegExp="famale"/>                                      1504
      <IntegerEvaluation
        Path="PPML/JOB/METADATA/DATUM/@age"
        ValueList="0~20"/>
    <and>
    </Expr>
    <Expr Name="pattern" Value="Pattern3">
    <and>
      <NameEvaluation
        Path="PPML/JOB/METADATA/DATUM/@gender"
        RegExp="male"/>                                        1505
      <IntegerEvaluation
        Path="PPML/JOB/METADATA/DATUM/@age"
        ValueList="21~INF"/>
    <and>
    </Expr>                                                    1506
    <Expr name="pattern" Value="Else"/>
  </MetadataMap>
</RunList>
...
```

FIG.15D

```
...
<AAParams Class="Parameter" ID="IDAAP"
Status="Available" settingA="defaultValue" PartIDKeys="DocTags
Metadata0">
  <AAParams Metadata0="Pattern1" settingB="value1">
   <AAParams DocTags="booklet" settingA="value booklet"/>         1507
  </AAParams>
  <AAParams Metadata0="Pattern2" settingB="value2"/>
   <AAParams DocTags="booklet" settingA="value booklet"/>         1508
  </AAParams>
  <AAParams Metadata0="Pattern3" settingB="value3"/>
   <AAParams DocTags="booklet" settingA="value booklet"/>         1509
  </AAParams>
  <AAParams Metadata0="Else" settingB="value4"/>
   <AAParams DocTags="booklet" settingA="value booklet"/>         1510
  </AAParams>
</AAParams>
...
```

FIG.16A

```
<PPML>
 <METADATA>
  <DATUM Key="RECORDLEVEL">JOB</DATUM>    1601
 </METADATA>
 <PAGE_DESIGN TrimBox="0 0 595 842"/>
 <JOB>
  <DOCUMENT>
   <PAGE>...</PAGE>
   <PAGE>...</PAGE>
  </DOCUMENT>
  <DOCUMENT>
   <PAGE>...</PAGE>
   <PAGE>...</PAGE>
  </DOCUMENT>
 </JOB>
 <JOB>
  <DOCUMENT>
   <PAGE>...</PAGE>
   <PAGE>...</PAGE>
  </DOCUMENT>
  <DOCUMENT>
   <PAGE>...</PAGE>
   <PAGE>...</PAGE>
  </DOCUMENT>
 </JOB>
 : (AND SO FORTH...)
```

FIG.16B

```
<PPML>
 <METADATA>
  <DATUM Key="RECORDLEVEL">JOB</DATUM>
 </METADATA>
 <PAGE_DESIGN TrimBox="0 0 595 842"/>
 <JOB>
  <METADATA>                                   1602
   <DATUM Key="recId">1001</DATUM>
   <DATUM Key="name">Sato</DATUM>
   <DATUM Key="gender">male</DATUM>
   <DATUM Key="age">38</DATUM>
  </METADATA
  <DOCUMENT>
    <PAGE>...</PAGE>
    <PAGE>...</PAGE>
  </DOCUMENT>
  <DOCUMENT>
    <PAGE>...</PAGE>
    <PAGE>...</PAGE>
  </DOCUMENT>
 </JOB>
 <JOB>
  <METADATA>                                   1603
   <DATUM Key="recId">1002</DATUM>
   <DATUM Key="name">Tanaka</DATUM>
   <DATUM Key="gender">Female</DATUM>
   <DATUM Key="age">23</DATUM>
  </METADATA
  <DOCUMENT>
    <PAGE>...</PAGE>
    <PAGE>...</PAGE>
  </DOCUMENT>
  <DOCUMENT>
    <PAGE>...</PAGE>
    <PAGE>...</PAGE>
  </DOCUMENT>
 </JOB>
   : (AND SO FORTH...)
```

FIG.16C

```
<PPML>
 <METADATA>
  <DATUM Key="RECORDLEVEL">JOB</DATUM>
 </METADATA>
 <PAGE_DESIGN TrimBox="0 0 595 842"/>
 <JOB>
  <METADATA>
   <DATUM Key="RecId">1001</DATUM>
   <DATUM Key="Name">Sato</DATUM>
   <DATUM Key="Gender">male</DATUM>
   <DATUM Key="Age">38</DATUM>
  </METADATA>
  <DOCUMENT>                                    ---1604
   <METADATA>
    <DATUM Key="DocType">booklet</DATUM>
   </METADATA>
   <PAGE>...</PAGE>
   <PAGE>...</PAGE>
  </DOCUMENT>
  <DOCUMENT>
   <PAGE>...</PAGE>
   <PAGE>...</PAGE>
  </DOCUMENT>
 </JOB>
 <JOB>
  <METADATA>
   <DATUM Key="RecId">1002</DATUM>
   <DATUM Key="Name">Tanaka</DATUM>
   <DATUM Key="Gender">Female</DATUM>
   <DATUM Key="Age">23</DATUM>
  </METADATA>
  <DOCUMENT>                                    ---1605
   <METADATA>
    <DATUM Key="DocType">booklet</DATUM>
   </METADATA>
   <PAGE>...</PAGE>
   <PAGE>...</PAGE>
  </DOCUMENT>
  <DOCUMENT>
   <PAGE>...</PAGE>
   <PAGE>...</PAGE>
  </DOCUMENT>
 </JOB>
   : (AND SO FORTH...)
```

FIG.17A

```
<PDFVT>
 <DPartRootDict>
  <RecordLevel>Record</RecordLevel>
 </DPartRootDict>
 <Record>
  <DocPart>
   <PDFPage>...</PDFPage>
   <PDFPage>...</PDFPage>
  </Docpart>
  <DocPart>
   <PDFPage>...</PDFPage>
   <PDFPage>...</PDFPage>
  </Docpart>
 </Record>
 <Record>
  <DocPart>
   <PDFPage>...</PDFPage>
   <PDFPage>...</PDFPage>
  </DocPart>
  <DocPart>
   <PDFPage>...</PDFPage>
   <PDFPage>...</PDFPage>
  </DocPart>
 </Record>
 : (AND SO FORTH...)
```

```
<PDFVT>
 <DPartRootDict>
   <RecordLevel>Record</RecordLevel>
 </DPartRootDict>
 <Record>
   <DPM>                              ⎫
     <RecId>1001</RecId>              ⎪
     <Name>Sato</Name>                ⎬ 1702
     <Gender>male</Gender>            ⎪
     <Age>38</Age>                    ⎪
   </DPM>                             ⎭
   <DocPart>
     <PDFPage>...</PDFPage>
     <PDFPage>...</PDFPage>
   </DocPart>
   <DocPart>
     <PDFPage>...</PDFPage>
     <PDFPage>...</PDFPage>
   </DocPart>
 </Record>
 <Record>
   <DPM>                              ⎫
     <RecId>1002</RecId>              ⎪
     <Name>Tanaka</Name>              ⎬ 1703
     <Gender>female</Gender>          ⎪
     <Age>23</Age>                    ⎪
   </DPM>                             ⎭
   <DocPart>
     <PDFPage>...</PDFPage>
     <PDFPage>...</PDFPage>
   </DocPart>
   <DocPart>
     <PDFPage>...</PDFPage>
     <PDFPage>...</PDFPage>
   </DocPart>
 </Record>
   : (AND SO FORTH...)
```

FIG.17C

```
<PDFVT>
 <DPartRootDict>
  <RecordLevel>Record</RecordLevel>
 </DPartRootDict>
 <Record>
  <DPM>
   <RecId>1001</RecId>
   <Name>Sato</Name>
   <Gender>male</Gender>
   <Age>38</Age>
  </DPM>
  <DocPart>
   <DPM>                                    ⌐1704
    <DocType>booklet</DocType>
   </DPM>
   <PDFPage>...</PDFPage>
   <PDFPage>...</PDFPage>
  </DocPart>
  <DocPart>
   <PDFPage>...</PDFPage>
   <PDFPage>...</PDFPage>
  </DocPart>
 </Record>
 <Record>
  <DPM>
   <RecId>1002</RecId>
   <Name>Tanaka</Name>
   <Gender>female</Gender>
   <Age>23</Age>
  </DPM>
  <DocPart>
   <DPM>                                    ⌐1705
    <DocType>booklet</DocType>
   </DPM>
   <PDFPage>...</PDFPage>
   <PDFPage>...</PDFPage>
  </DocPart>
  <DocPart>
   <PDFPage>...</PDFPage>
   <PDFPage>...</PDFPage>
  </DocPart>
 </Record>
    : (AND SO FORTH...)
```

INFORMATION PROCESSING APPARATUS, INFORMATION PROCESSING APPARATUS CONTROL METHOD, AND STORAGE MEDIUM

BACKGROUND OF THE INVENTION

1. Field of the Invention

The present invention relates to an information processing apparatus that processes print data having a hierarchical structure and to which metadata can be added, a method for controlling the information processing apparatus, and a storage medium therefor.

2. Description of the Related Art

In recent years, as a processing speed of and the image quality of a product output by an electrophotographic printing apparatus and an inkjet type printing apparatus have become higher, the print on demand (POD) market has been widespreadly utilized. In the POD market, digital printing based on electronic data is executed by making the most of a digital image forming apparatus, such as a digital copying machine or a digital multifunction peripheral (MFP). By using a digital image forming apparatus, which can implement plateless printing, a job of a relatively small lot can be printed with low costs and in a short delivery time.

In the POD market, in which electronic data is used as its characteristic, variable data printing (VDP) is used as a print method. In a VDP document, which is used in the VDP, a fixed portion and a variable portion are separated from each other. In addition, data of the variable portion is supplied from a data source, such as a relational database (RDB) or a comma separated value (CSV) file. If a column (field) of the data source is associated with a variable portion of a document template and if the field associated with the variable portion of the document template is applied to each row (record) of the data source, print jobs having slightly mutually different contents can be executed.

Most of VDP documents whose data has been supplied thereto in the above-described manner are described using the structured page description language (structured PDL) for VDP. The "structured PDL" refers to the PDL whose document structure is described using a markup language. The structured PDL is described using a markup language based on eXtended Markup Language (XML).

In addition, recently, a structured PDL to which metadata can be added has been developed. More specifically, the structured PDL includes personalized print markup language (PPML) and portable document format variable and transactional (PDF/VT). Further, metadata can be described in each document layer of the structured PDL to which metadata can be added. In general, metadata include a key and a value. The key in metadata includes various descriptions, such as a name, an address, age, sex, and personal preference of a recipient. A value includes the actual content of each key. For example, "male" or "female" may be described as a value of the key "sex". As values of the key "age", a value "24" or "52" can be described.

Meanwhile, recently, a job ticket has been widespreadly utilized. The job ticket can be utilized to execute print setting to a specific document layer of the structured PDL to which metadata can be added and to execute different print setting to different recipients.

The above-described job ticket includes a job definition format (JDF). A JDF job ticket can include a description of a print setting, for example, for printing data on a matte sheet if the key "sex" has a value "male" for a specific recipient while printing data on a gloss sheet if the key "sex" has a value "female" for a specific recipient.

Conventionally, software for executing print setting has a print setting user interface, such as a printer driver or a hot folder application. However, via a conventional print setting user interface, a user is allowed only to execute a print setting to the entire PDL data or only to execute an exceptional print setting to a specific page. Accordingly, with the conventional method, in processing a VDP document described using a structured PDL to which metadata can be added, a user can neither execute a print setting to each layer of the PDL nor execute variable print setting that is variable according to a value of the metadata added to the PDL.

As discussed by Japanese Patent Application Laid-Open Nos. 2003-316548 and 2003-316549, a conventional method generates a group of metadata included in a VDP document and having the same value (referred to as VDP family) and executes a print setting to the group. After executing the print setting, a job is divided in the unit of a group, and the print setting is output as a job ticket (JDF job ticket). Then, the job and the print setting are input to a printer.

However, if the above-described conventional method is used, in executing a print setting to a VDP document, it is necessary to execute the print setting to the very VDP document whose data size is large. Accordingly, because it is necessary for the user to execute the print setting to the very VDP document, the conventional method may degrade the usability.

SUMMARY OF THE INVENTION

According to an aspect of the present invention, an information processing apparatus for processing print data having a hierarchical structure, in which metadata can be added to layers in the hierarchical structure, includes a receiving unit configured to receive an instruction to mutually associate a layer included in a template corresponding to the print data and, print and output product definition information, a setting unit configured to execute a print setting corresponding to the print and output product definition information to the layer of the template according to the instruction received by the receiving unit, an output unit configured to output a job ticket including a correspondence relation between the print setting and the print data corresponding to the template to which the print setting has been set, and an addition unit configured to add, to the print data, metadata for mutually associating the print setting described in the job ticket output by the output unit and a layer of the print data corresponding to a layer of the template to which the print setting has been set.

An aspect of the present invention can provide an information processing apparatus capable of executing a print setting to a VDP document which can achieve a high usability by using a template of a VDP document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 schematically illustrates an example of a relationship between a Product Intent and a print setting.

FIGS. 15A through 15D illustrate an example of a job ticket described in JDF.

FIGS. 16A through 16C illustrate an example of a VDP document to be output, which is described in PPML.

FIGS. 17A through 17C illustrate an example of a VDP document to be output, which is described in PDF/VT.

DESCRIPTION OF THE EMBODIMENTS

Various exemplary embodiments, features, and aspects of the invention will be described in detail below with reference to the drawings.

<Configuration of Print Workflow (WF) System>

Figure 1:
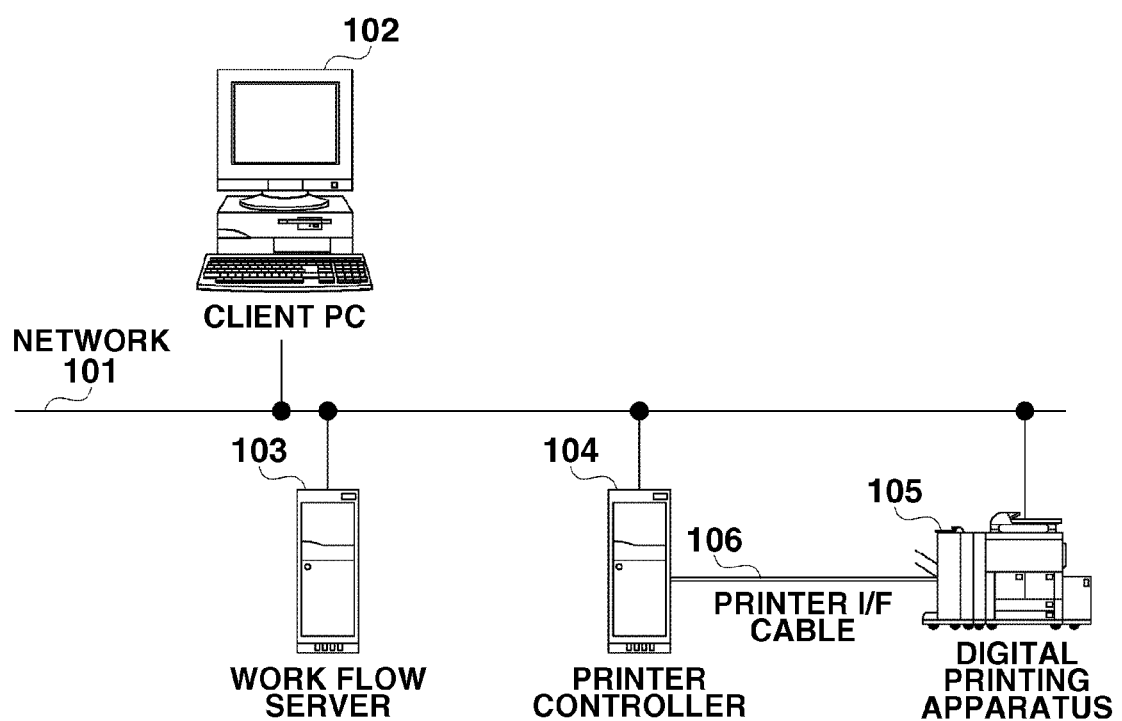
FIG. 1 illustrates an exemplary configuration of a system that can implement an exemplary embodiment of the present invention.

FIG. 1 illustrates an exemplary system configuration of a print WF system according to an exemplary embodiment of the present invention. The print WF system includes a client PC 102, a workflow server 103, a printer controller 104, and a digital printing apparatus 105 which are in communication with one another via a network 101. Further, the printer controller 104 and the digital printing apparatus 105 are in communication with each other via a printer interface (I/F) cable 106.

The client PC 102 edits a VDP document which is print data of the present invention, edits a print setting, and outputs a print job which includes the VDP document and a job ticket. Editing of the VDP document (the print data) usually includes editing of a document, designation of a variable region and a fixed region, designation of a data source, and association of a field of the data source and the variable region and is executed in this order. Processing for editing a print setting and processing for outputting a print job is characteristic to the present invention, so that it will be described in detail below. In the present exemplary embodiment, a VDP document has a hierarchical structure, and metadata can be added to the VDP document.

The client PC 102 transmits a print job to the workflow server 103. The workflow server 103 manages a workflow for executing a print job. The workflow server 103 transmits a print job to the printer controller 104 according to a print instruction input by a user or according to a previously set schedule. Transmission and reception of the data (the print job) is executed by the following method. Specifically, a hot folder is previously provided to the printer controller 104. The workflow server 103 stores the print job in the hot folder.

The printer controller 104 executes raster image processing (RIP) on the VDP document included in the print job and analyzes the job ticket included in the print job. Further, the printer controller 104 transmits a bitmap image generated by the RIP to the digital printing apparatus 105 via the printer I/F cable 106. Moreover, the printer controller 104 converts a result of analyzing the job ticket into a printer control protocol that can be interpreted by the digital printing apparatus 105 and executes and inputs a print setting and a print instruction to the digital printing apparatus 105. If the digital printing apparatus 105 itself can interpret the job ticket, the digital printing apparatus 105 can interpret the job ticket instead of the printer controller 104.

In the exemplary embodiment of the present invention, the client PC 102, the workflow server 103, the printer controller 104 are in communication with one another via the network 101. However, the present invention is not limited to the above-described configuration. In other words, functions of the client PC 102, the workflow server 103, and the printer controller 104 can be implemented by the same computer instead.

<Configuration of Client PC>

Figure 2A:
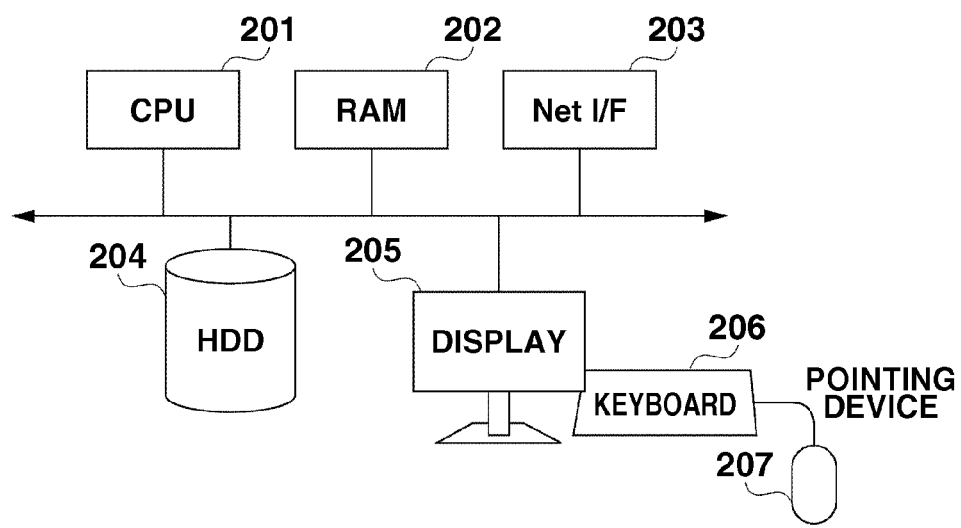
FIG. 2A illustrates an exemplary configuration of a client personal computer (PC).

The client PC 102 will be described in detail below with reference to FIG. 2A. FIG. 2A is a block diagram illustrating an exemplary hardware configuration of the client PC 102 according to the present exemplary embodiment. The hardware configuration of the client PC 102 described below with reference to FIG. 2A is a mere example. For the hardware configuration of the client PC 102, various other general configurations, which include various connection methods, buses, and interfaces, can also be used to implement the function of the present exemplary embodiment.

Referring to FIG. 2A, a central processing unit (CPU) 201 controls the operation of the entire client PC 102 according to a control program loaded on a random access memory (RAM) 202. The RAM 202 is a built-in storage unit on which a control program of the client PC 102 which is executed by the CPU 201, and various data pieces, such as document data and image data, are loaded. A network I/F 203 is an interface with a network, such as the Internet, via which data communication is executed under control of the CPU 201. A hard disk drive (HDD) 204 stores control software of the client PC 102 and various data pieces. The client PC 102 further includes a display 205, a keyboard 206, and a pointing device 207, such as a mouse.

Various types of software (programs) stored on the HDD 204 is loaded and executed on the RAM 202 under control of the CPU 201, where necessary, using a function of an operating system (OS) loaded on the RAM 202.

<Configuration of Workflow Server>

The configuration of the workflow server 103 is similar to that of the client PC 102.

<Configuration of Printer Controller>

Figure 2B:
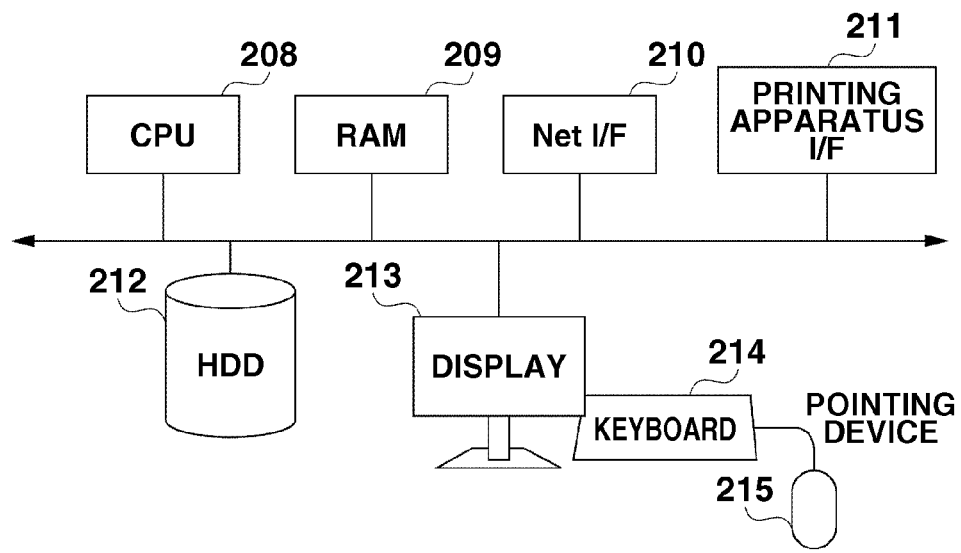
FIG. 2B illustrates an exemplary configuration of a printer controller.

An exemplary hardware configuration of the printer controller 104 will be described in detail below with reference to FIG. 2B. FIG. 2B is a block diagram illustrating the hardware configuration of the printer controller 104 according to the present exemplary embodiment of the present invention. The hardware configuration of the printer controller 104 described below with reference to FIG. 2B is a mere example.

For the hardware configuration of the printer controller 104, similar to the case of the client PC 102, various other general configurations, which include various connection methods, buses, and interfaces, can also be used to implement the function of the present exemplary embodiment.

Referring to FIG. 2B, a CPU 208 controls the entire operation of the printer controller 104 according to a control program loaded on a RAM 209. The RAM 209 is a built-in storage unit on which a control program of the printer controller 104 which is executed by the CPU 208, and various data pieces, such as document data and image data, are loaded. A network I/F 210 is an interface with a network, such as the Internet, via which data communication is executed under control of the CPU 208.

An HDD 212 stores control software of the printer controller 104 and various data pieces. The printer controller 104 further includes a display 213, a keyboard 214, and a pointing device 215, such as a mouse. A printing apparatus I/F 211 is connected with the digital printing apparatus 105 via the printer I/F cable 106 and is used for transmitting RIP-processed data.

Various types of software stored on the HDD 212 is loaded and executed on the RAM 209 under control of the CPU 208, where necessary, with using a function of an OS loaded on the RAM 209.

<Module Configuration>

In the present exemplary embodiment, it is supposed that the print setting apparatus of the present invention is implemented as apart of modules of a VDP application. However, the present invention is not limited to the embodiment. More specifically, an independent and separately provided application can be used as the VDP application.

Figure 3:
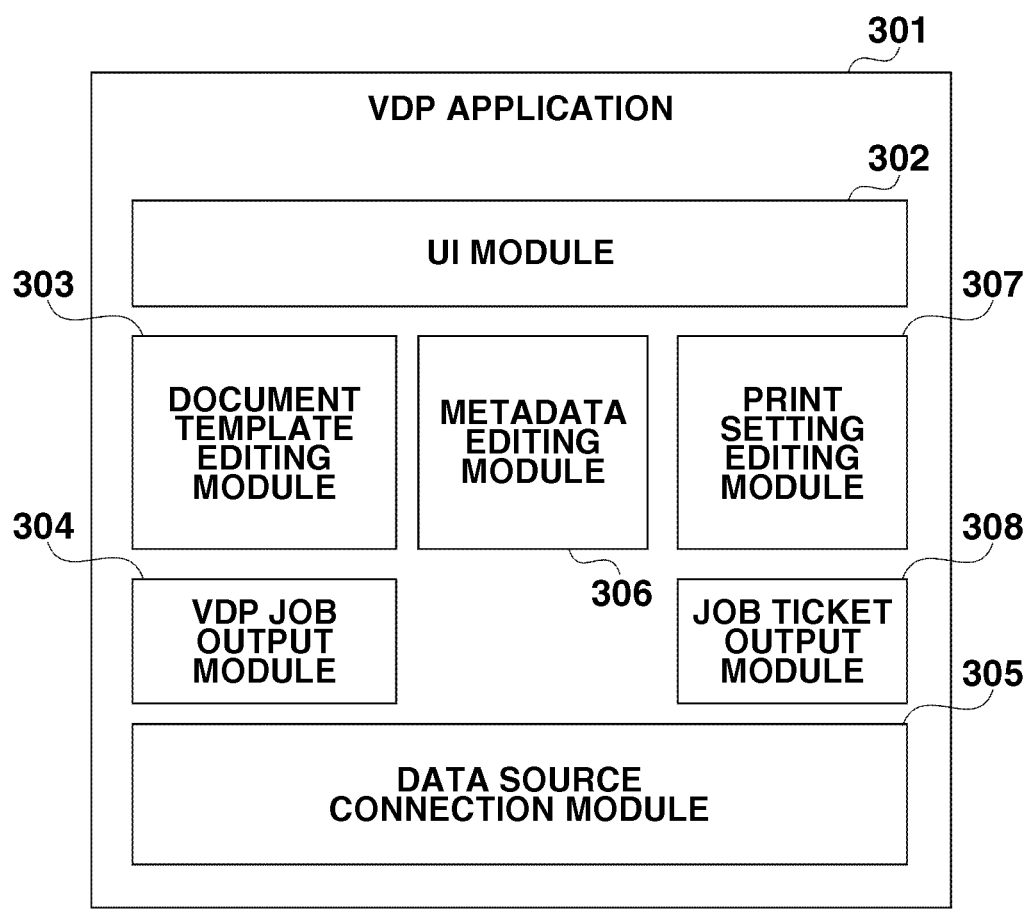
FIG. 3 schematically illustrates an exemplary configuration of a module.

FIG. 3 illustrates an exemplary module configuration of a VDP application 301 according to the present exemplary embodiment. Referring to FIG. 3, a VDP application 301 includes a UI module 302, a document template editing module 303, a VDP job output module 304, a data source connection module 305, a metadata editing module 306, a print setting editing module 307, and a job ticket output module 308. The VDP application 301 operates on the client PC 102 which is an information processing apparatus capable of implementing a function of the present invention. Execution of each module of the VDP application 301 is controlled by the CPU 201 illustrated in FIG. 2A.

A function of each module will be described in detail below. The UI module 302 is a module for displaying a document template editing screen and a print setting editing screen to the user and for receiving a user operation. The print setting editing screen will be described in detail below with reference to FIG. 4.

The document template editing module 303 is a module for editing a document template. The document template editing module 303 executes processing for applying a result of editing on an image imposition block of a sheet and designation of a variable region and a fixed region to the document template according to an editing instruction input by the user via the UI module 302. In addition, the document template editing module 303 supplies data acquired from a data source to the document template. The document template editing module 303 is a function of a general VDP application, thus a detailed description thereof is omitted. The VDP job output module 304 is a module for outputting data in a form that the data from the data source is supplied to the document template as a VDP document. In addition, the VDP job output module 304 describes metadata in the VDP document according to an instruction input by the metadata editing module 306, which will be described in detail below.

The data source connection module 305 is a module for connecting to the data source to acquire data. The metadata editing module 306 is a module for managing metadata described in the VDP document. The print setting editing module 307 is a module for executing a print setting to the VDP document according to an editing instruction input by the user via the UI module 302. The job ticket output module 308 is a module for outputting the print setting edited by the print setting editing module 307 as a job ticket (e.g., as a JDF print job ticket).

<Print Setting Screen>

Now, an example of a print setting editing screen displayed by the UI module 302 will be described in detail below. An exemplary flow of the print setting which is executed using the print setting editing screen illustrated in FIG. 4 will be described in detail below with reference to FIG. 6.

Figure 4:
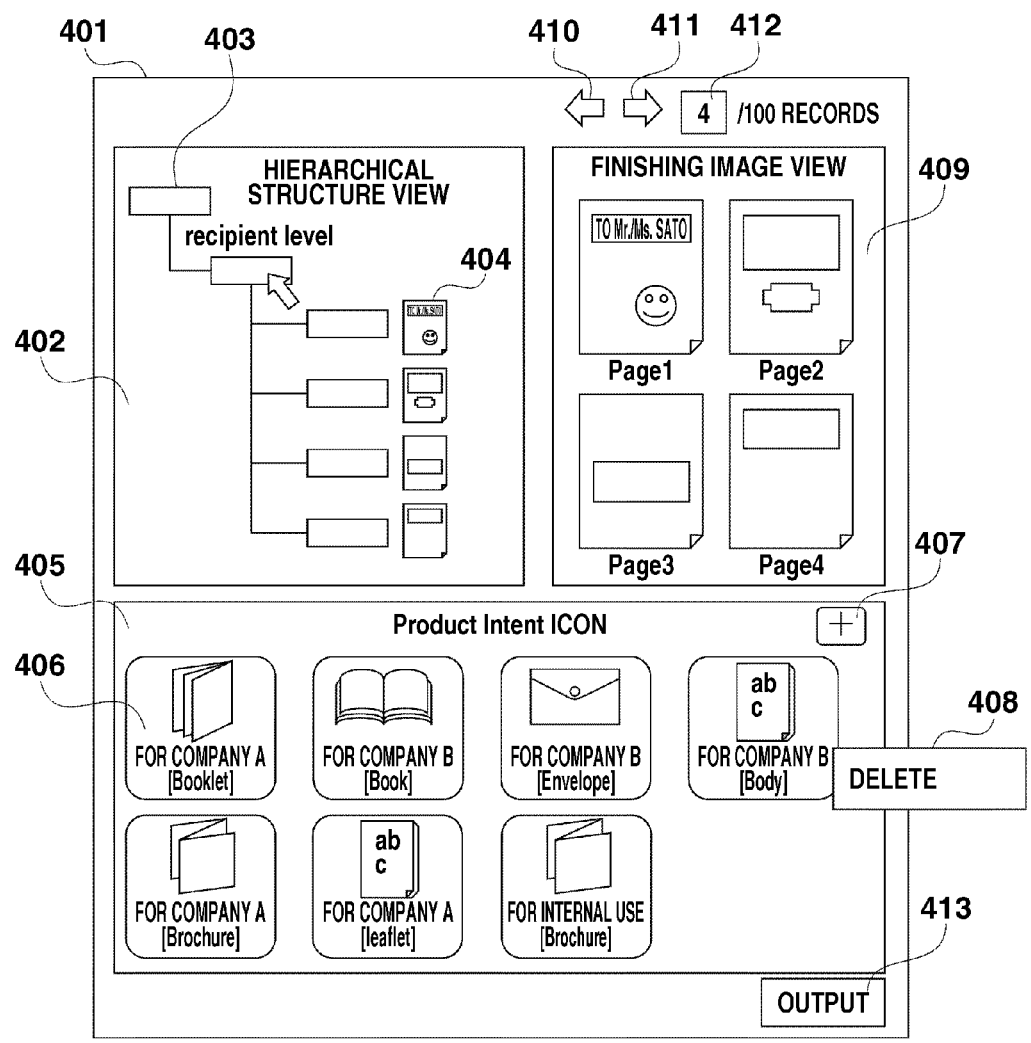
FIG. 4 illustrates an example of a user interface.

FIG. 4 illustrates an exemplary configuration of a print setting editing screen 401. The print setting editing screen 401 is displayed by the UI module 302 on the display 205 of the client PC 102 when the CPU 201 of the client PC 102 executes the VDP application 301.

Referring to FIG. 4, a hierarchical structure view 402 indicates the hierarchical structure of a document template. A layer node 403 indicates one layer. A lowest-order node is equivalent to one image imposition block. In the example illustrated in FIG. 4, four image imposition blocks are included in one template. One image imposition block is usually equivalent to one page. However, if a text or an image is not fully included in one image imposition block as a result of supplying data into one image imposition block, the data may be provided across a plurality of pages. The lowest-order node displays an image imposition block thumbnail 404.

In the example illustrated in FIG. 4, the document template is displayed in the hierarchical structure view 402. Accordingly, for an actual VDP document, the document templates are expanded in the number equivalent to the number of records included in the data source. The UI module 302 notifies the user of from which node the nodes are to be expanded by displaying a "Recipient Level" which is associated with the node. In the example illustrated in FIG. 4, the second node from the top indicates the Recipient Level.

A view 405 displays a list of Product Intent icons. In the present exemplary embodiment, a "Product Intent" corresponds to an output product of a VDP document. Further, the Product Intent includes a default value of the print setting and information about an Intent type (print and output product definition information). A Product Intent icon is an icon corresponding to the print and output product definition information. When the Product Intent icon is associated with the node included in the hierarchical structure view 402 described above, the print setting is executed to a layer of the document template based on the print and output product definition information.

The Intent Type includes "booklet", "book", "brochure", "leaflet", "cover", "body", and the like. FIG. 5 is an example of a table including an Intent Type name, a description of the corresponding Intent type, and a print setting category for each Intent type. The table is stored on the HDD 204.

To each Intent, a combination of a print setting category common to a plurality of Intents and a print setting category uniquely provided to each Intent can be set. More specifically, if a poster is to be printed, a setting of a sheet, a print quality, an imposition method, and whether to print bar codes can be set to the Intent.

The user can add a Product Intent icon by pressing a button 407. A method for adding the Product Intent icon will be described in detail below with reference to FIG. 12. The user can delete the Product Intent icon by selecting a delete button 408 which is displayed as a context menu on a field including the Product Intent icons.

In a finishing image view field 409, a virtual finishing state corresponding to one record (for one recipient) when the print setting is executed to each layer of the document template is displayed. By referring to the virtual finishing state, the user can verify the finishing state of the resulting output product.

By pressing buttons 410 and 411, the user can change the record to be supplied to the document template. The record number of the current record is displayed in a field 412. The button 410 can be operated to shift to a next record. The button 411 can be operated to shift to a previous record.

A result of supplying data of the data source to the document template can be displayed as a thumbnail in an image imposition block in the finishing image view field 409. In this case, a thumbnail of data from the data source supplied to the document template is previously generated. Alternatively, each time the user presses the button 410 or 411, the data source connection module 305 can connect to the data source, acquire data therefrom, and generate a thumbnail supplied to the document template.

As described above, the finishing image view field 409 can display a thumbnail of the data acquired from the data source supplied to the document template. Alternatively, the document template itself can be displayed in the finishing image view field 409 as a thumbnail. In this case, it becomes unnecessary to acquire data from the data source. A button 413 can be pressed to execute processing for outputting a job ticket and a VDP document according to the setting executed by the user via the print setting editing screen 401. The processing for outputting a job ticket and a VDP document will be described in detail below with reference to FIG. 13.

<Flow of Print Setting Processing>

Figure 6:
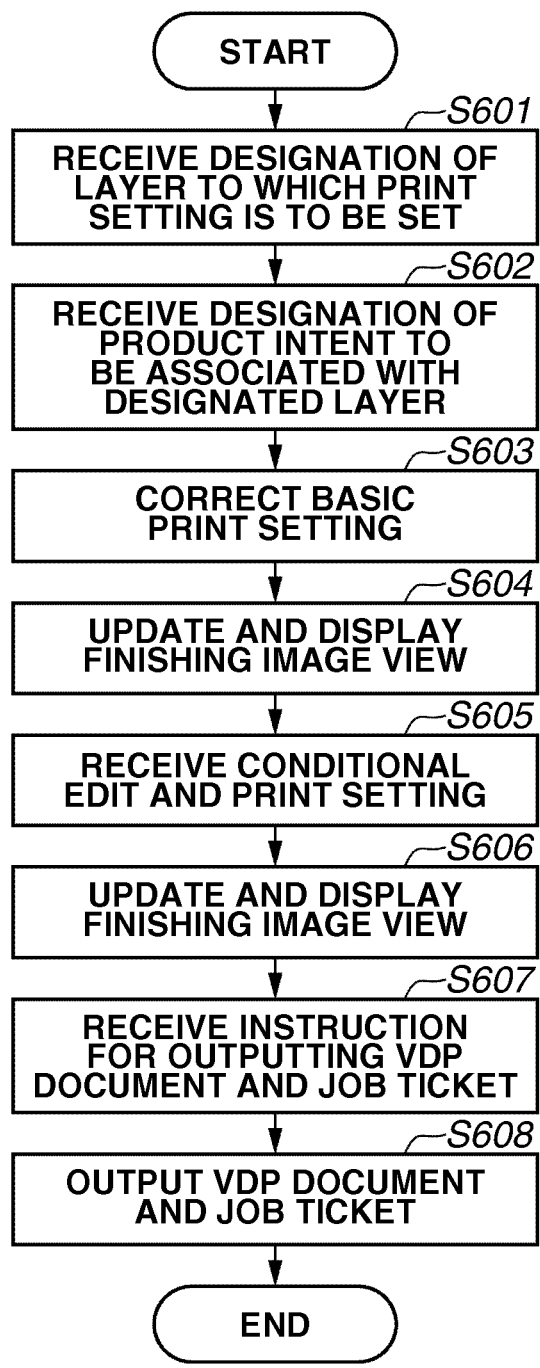
FIG. 6 is a flow chart illustrating an exemplary flow of print setting processing.

An exemplary flow of print setting processing will be described in detail below with reference to FIG. 6. FIG. 6 is a flow chart illustrating an exemplary flow of print setting processing. Processing in each step of the flow chart in FIG. 6 is implemented by the CPU 201 by executing the VDP application 301 by controlling each module of the VDP application 301.

Referring to FIG. 6, in step S601, the UI module 302 receives designation of a layer of a document template to which the print setting is to be executed from the user. In the example illustrated in FIG. 4, the UI module 302 allows the user to designate the layer node 403.

In step S602, the UI module 302 receives designation of a Product Intent to be associated with the layer node 403, which has been received in step S601, from the user. The processing in step S602 will be described in more detail below with reference to FIG. 8. After receiving an instruction to associate the print and output product definition information corresponding to the designated Product Intent with the document template from the user, the UI module 302 notifies the print setting editing module 307 of the received information. The print setting editing module 307 stores the received information on the HDD 204. In the above-described manner, the print setting editing module 307 sets the print setting corresponding to the designated print and output product definition information to the layer of the document template according to the instruction received by the UI module 302.

In step S603, the UI module 302 receives a correction of the print setting to the layer node received in step S601 from the user. The setting is referred to as a "basic print setting" in the present exemplary embodiment. The setting is handled as a "basic" print setting to identify the same from a conditional print setting, which uses metadata. The conditional print setting will be described in detail below. More specifically, in step S603, a context menu is displayed on the layer node to prompt the user to select execution of the basic print setting. Then, the UI module 302 indicates a print setting dialog illustrated in FIG. 7 to the user to receive an input of the print setting from the user.

Figure 7:
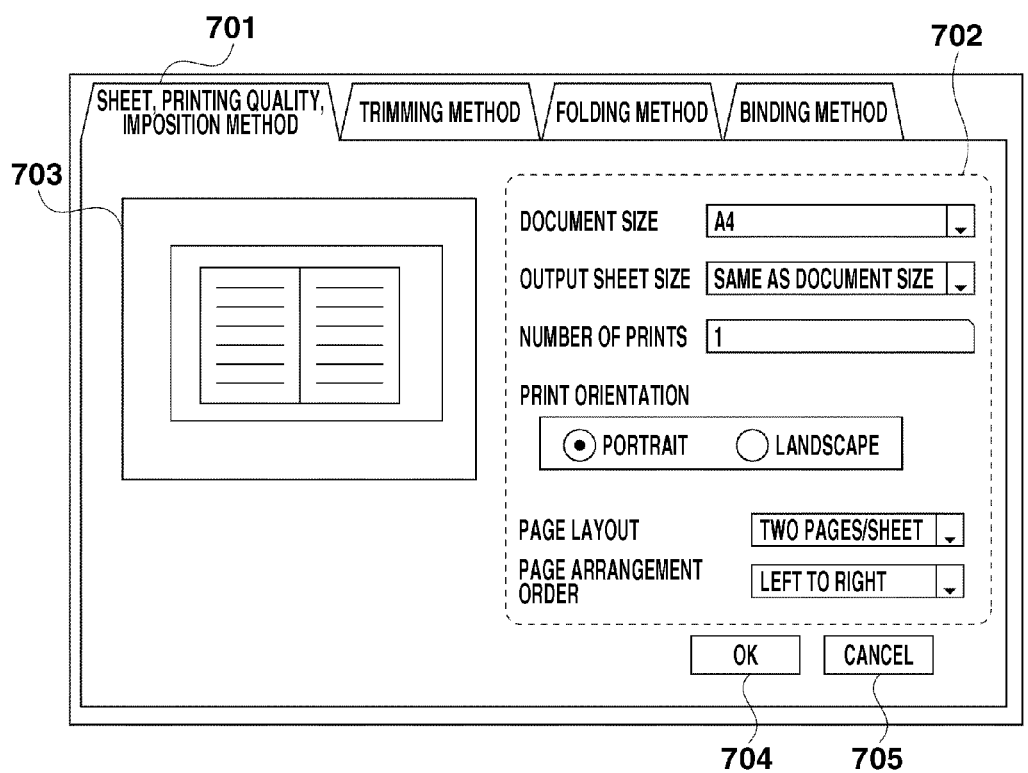
FIG. 7 illustrates an example of a setting screen for a basic print setting.

Referring to FIG. 7, a tab 701 can be operated to designate a print setting category. In the example illustrated in FIG. 7, the user can select the print setting included in the print setting category set as the Intent Type of the Product Intent set to a currently selected layer node only. If the Product Intent "booklet" has been set to the currently selected layer node, the user can execute the print setting for a trimming method, a folding method, and a binding method as well as the print setting category common to the Intent.

A field 702 includes each print setting included in the print setting category. The user can set a setting value to each print setting using a drop-down box. A view field 703 schematically displays a result of applying the setting value designated by the user. The user can press a button 704 to apply the setting. By pressing a button 705, the user can cancel the setting.

In step S604, the UI module 302 updates and displays the finishing image view 409 according to the print setting received in step S603. In step S605, the UI module 302 receives a conditional print setting input by the user. More specifically, the user can select execution of the conditional print setting via a context menu displayed on the layer node. Processing for executing the conditional print setting will be described in detail below with reference to FIG. 9. The print setting editing module 307 sets the conditional print setting received by the UI module 302 to the document template.

In step S606, the UI module 302 updates and displays a finishing image view 914 which is displayed on a print setting screen illustrated in FIG. 9 according to the conditional print setting received in step S605. In step S607, the UI module 302 receives an instruction to output the VDP document and the job ticket from the user. In the example illustrated in FIG. 4, the UI module 302 receives the output instruction from the user given by pressing the button 413.

In step S608, the VDP job output module 304 and the job ticket output module 308 output the VDP document and the job ticket. A correspondence relation between the set print setting and the VDP document and the content of the print setting are described in the job ticket. Further, metadata for associating the print setting with a layer of the VDP document corresponding to a layer of the template to which the print setting has been set is added to the VDP document. Processing in step S608 will be described in detail below with reference to FIG. 13. The processing in steps S601 through S605 is not limited to be executed only once and may be repeatedly executed for the number of times designated by the user.

<Mutual Association between Layer Node and Product Intent Icon>

As described above, in step S602 in FIG. 6, the UI module 302 receives designation of the Product Intent to be associated with the layer node from the user. The processing in step S602 will be described in more detail below with reference to FIGS. 8A and 8B.

Figure 8A:
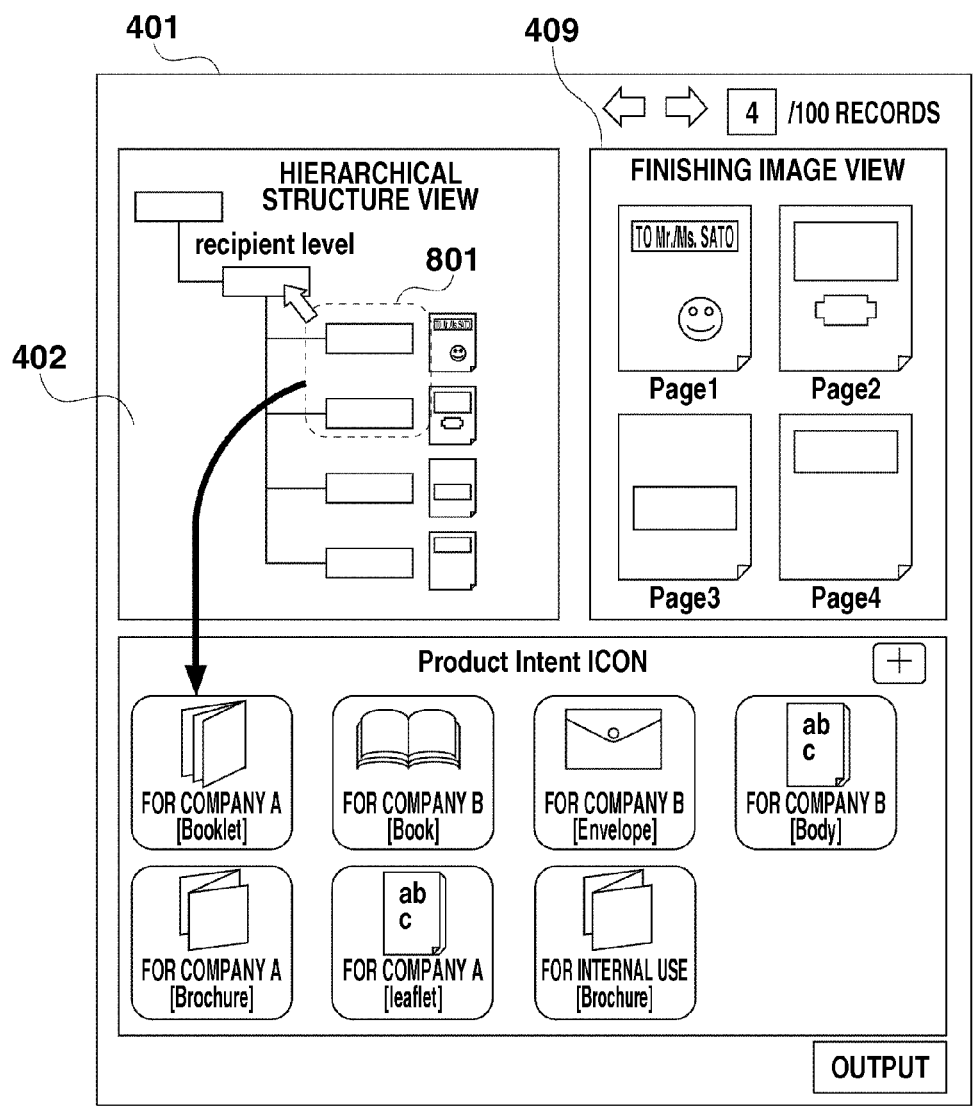
FIGS. 8A and 8B schematically illustrate an exemplary flow for mutually associating a document layer and a print setting.

In the present exemplary embodiment, it is supposed that first and second image imposition blocks (pages) are subjected to the print setting to be printed as a booklet. Referring to FIG. 8A, at first, the user selects a layer node 801 which is to be printed as a booklet.

Then, the user drags and drops the selected layer node onto the Product Intent icon which corresponds to a booklet. Alternatively, the user can select the Product Intent icon corresponding to the booklet via a context menu displayed on the layer node.

Figure 8B:
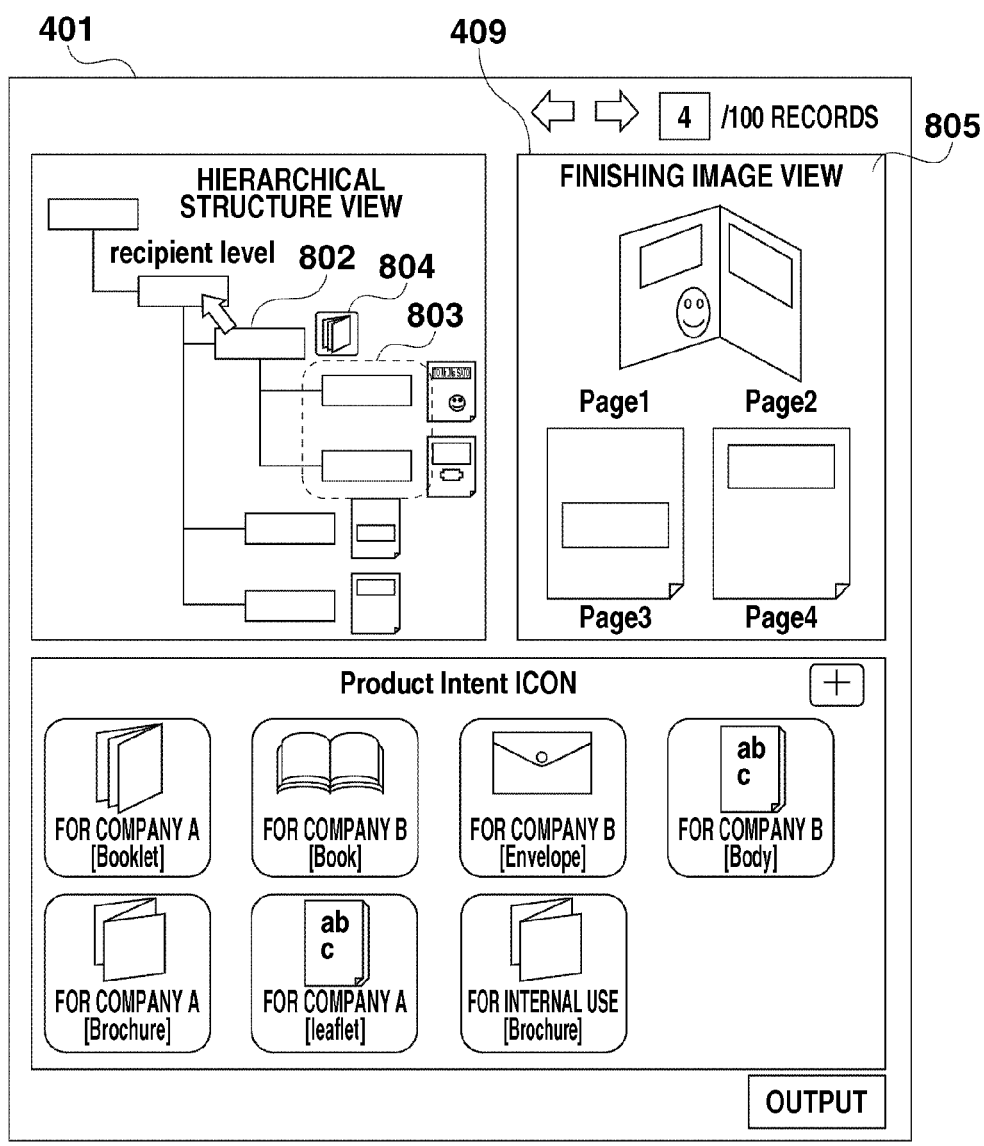

In this case, as illustrated in FIG. 8B, one layer node 802 is added and the layer node 801 which is designated by the user is moved under the newly added layer node 802. In the example illustrated in FIG. 8B, a layer node 803 is equivalent to the layer node 801 moved to the order below the layer node 802. A Product Intent icon 804 is displayed near the newly added layer node 802. Accordingly, the user can easily recognize the correspondence relation.

At the same time, the finishing image view field 409 displays an image of the finishing state 805 according to a default value of the print setting set to the associated Product Intent. In the example illustrated in FIG. 8B, the user has selected a layer node immediately above the newly added layer node. Accordingly, the image of the finishing state 805 in the finishing image view field 409 is displayed to notify the user that the first and the second pages are output as a booklet and two pages of single sheet are output as the third and the fourth pages. The Product Intent and the layer node are mutually associated in the above-described manner.

<Editing of Conditional Print Setting>

Figure 9A:
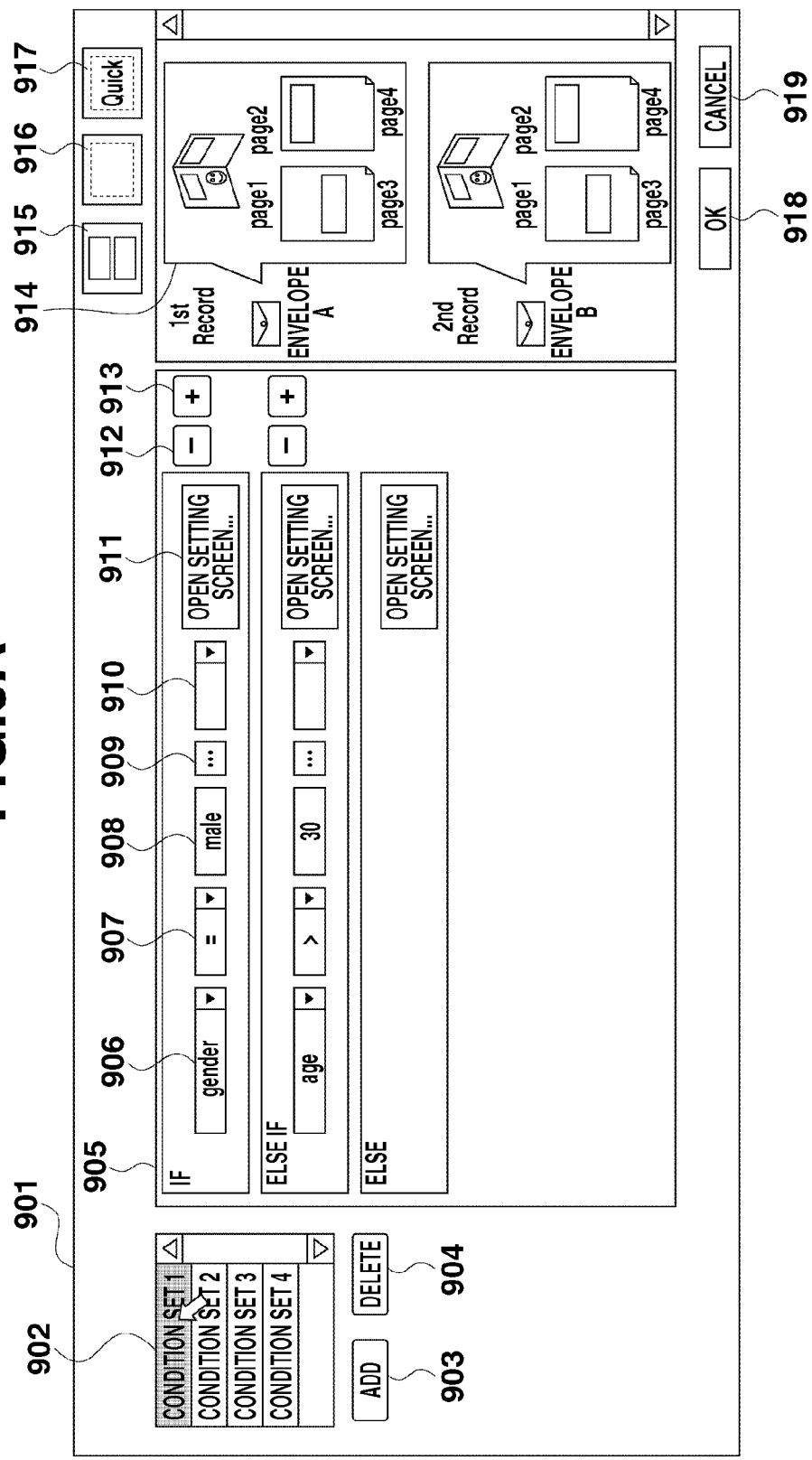
FIGS. 9A and 9B illustrate an example of a condition editing screen used during conditional print setting.
Figure 9B:
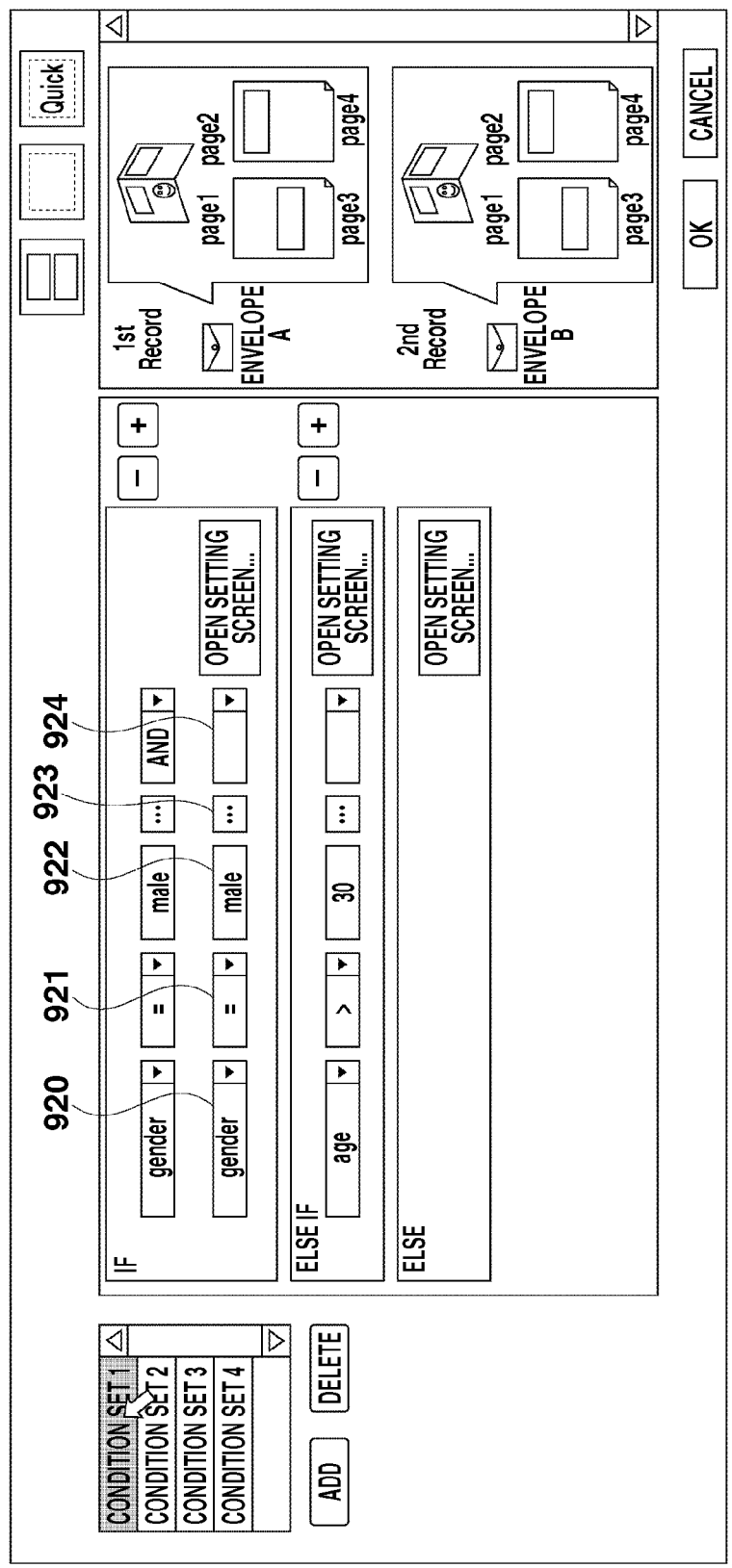

Now, an exemplary operation for executing the conditional print setting will be described in detail below with reference to FIGS. 9A and 9B. FIG. 9A illustrates an example of a screen for executing the conditional print setting. FIG. 9B illustrates a screen displayed when the conditions illustrated in FIG. 9A are operated by a logical conjunction "AND".

Referring to FIG. 9A, a dialog 901 is displayed to allow a user to execute a conditional print setting. The user can execute a setting of a condition with respect to metadata and the print setting is executed when the condition is satisfied to the metadata.

A field 902 displays a list of a series of conditions starting with an IF statement and ending with an ELSE statement. In the following description, the series of conditions starting with the IF statement and ending with then ELSE statement and the print setting set for the condition are collectively referred to as a "condition set". The user can add a condition set by operating a button 903. Further, the user can delete a condition set by operating a button 904.

A field 905 displays conditions included in one condition set. After receiving designation of one condition set from the user via the field 902, the UI module 302 displays the field 905 corresponding to the condition set designated by the user. The user can select a desired condition via user interfaces 906 through 909. In the example illustrated in FIG. 9A, the user has designated a condition in which a key "gender" is equal "=" a constant "male".

A drop-down box 906 can be operated by the user to designate a name of the key of the metadata which is the target of a condition. More specifically, the drop-down box 906 displays a list of keys that have been added to the layer node selected when the dialog 901 is displayed. The user selects one from among the keys included in the list. In the example illustrated in FIG. 9A, the user has selected the key "gender".

A drop-down box 907 includes a list of comparison operators for the conditions. The user can select one from among those included in the list. More specifically, the user can select a comparison operator, such as "=", ">", or "!=". The comparison operator "=" indicates that the value selected via the field 906 equals the value selected via the field 908. The comparison operator ">" indicates that the value selected via the field 906 is greater than the value selected via the field 908. The comparison operator "!=" indicates that the value selected via the field 906 is different from the value selected via the field 908. In the example illustrated in FIG. 9A, the comparison operator "=" has been designated by the user.

Via the field (text box) 908, the user can designate a constant to be compared with the key designated via the field 906. In the example illustrated in FIG. 9A, the user has designated the constant "male".

By pressing a button 909, the user can select the constant to be described in the text box 908 from the list of values of the key stored in the metadata designated from the drop-down box 906. The UI module 302 displays values that can be set to a record corresponding to the designated key without any overlap. In the example illustrated in FIG. 9A, when the user presses the button 909, the constant "male" or "female" which can be the value of the key "gender" is displayed. When the user selects a value from the list, the UI module 302 displays the selected value in the text box 908. The user can directly enter a constant in the text box 908 and (or) select one from those included in the list of values included in the metadata displayed by pressing the button 909.

A drop-down box 910 can be operated to combine the conditions with the operator "AND" or "OR". When the operator "AND" or "OR" is selected by the user, a control for inputting a condition is displayed below the conditions as illustrated in FIG. 9B. In this state, the user is allowed to combine the conditions with the operator.

When the user presses a button 911 and if a specific record matches the conditions designated via the fields 906 through 909, the screen shifts to a print setting editing screen for applying the print setting to the record. On the other hand, if the specific record does not match the conditions designated via the fields 906 through 909, an ELSE IF condition entered in a field below the conditions is evaluated. If the specific record does not match any of the ELSE IF conditions, the print setting designated using the ELSE operator is applied.

Figure 10:
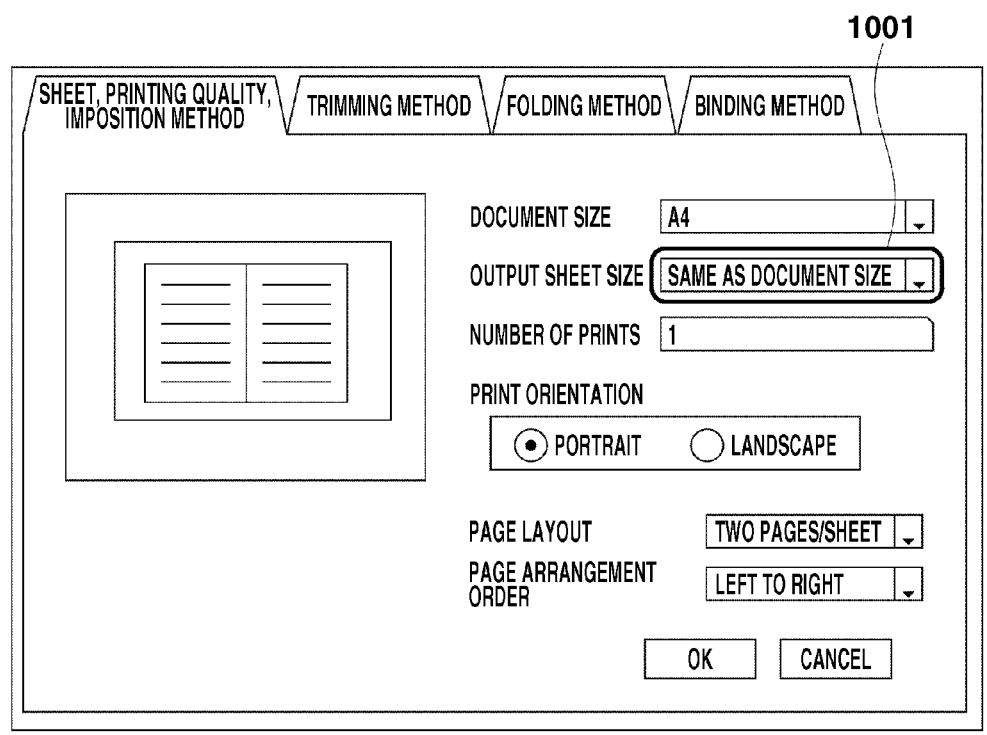
FIG. 10 illustrates an example of a print setting screen used in conditional print setting.

FIG. 10 illustrates an example of a print setting editing screen displayed when the user presses the button 911. On the print setting editing screen illustrated in FIG. 10, the UI module 302 displays a state in which the basic print setting has been input as a default value of the print setting. The UI module 302 receives a change in the print setting executed by the user and displays the changed print setting so that the changed print setting can be easily recognized by the user. More specifically, as illustrated in FIG. 10, the UI module 302 displays the changed print setting surrounded with a rectangle 1001.

A button 912 can be operated to delete the condition and the print setting designated and set via the fields and buttons 906 through 911. A button 913 can be operated to add an ELSE IF condition. A view 914 displays a finishing image of each record to the user. A button 915 can be operated to serially arrange and display finishing images of each record in relation to the view 914. A button 916 can be operated to independently arrange and display finishing images of each record in relation to the view 914.

A button 917 can be operated to display a finishing image of each condition set record by record in relation to the view 914. In the following description, the function for displaying a finishing image of each condition set record by record in relation to the view 914 will be referred to as a "quick preview". When the user presses the button 917, the number of condition sets is calculated and a pattern of available print settings is determined. Further, the UI module 302 displays a finishing preview of one record for each pattern. With the above-described configuration, the present exemplary embodiment can save the user from having to verify the print setting when the number of records included in the data source is large.

Suppose that the basic print setting includes designation "use white paper" in a specific condition set and the following conditional print setting has been executed.

(1) IF gender=male AND age<20, use red paper;
(2) IF gender=female AND age<20, use yellow paper;
(3) IF gender=male AND age≥20, use brown paper;
(4) ELSE, use the basic print setting.

In the quick preview, each record corresponding to the above four patterns is displayed in the finishing image view.

A button 918 can be operated to finally set and apply the conditional print setting. When the user presses the button 918, the conditional print setting designated by the user is stored on the HDD 204. A button 919 can be pressed to cancel the conditional print setting.

Controls (fields) 920 through 924 illustrated in FIG. 9B are similar to the controls 906 through 910 illustrated in FIG. 9A, respectively, and are added if the operator "AND" or "OR" is designated via the control 910 in FIG. 9A. The user interface displayed on the screen 901 is a mere example. More specifically, a text box can be used as the control displayed as a drop-down box. Alternatively, instead of providing the control, the condition can be described using a script language.

By executing the conditional print setting in the above-described manner, the conditions can be set to the print setting to a layer of the VDP document and to a value of metadata added to the VDP document. In this manner, the present exemplary embodiment can set a variable print setting.

<Quick Preview>

An exemplary flow of processing for implementing the quick preview will be described in detail below with reference to a flow chart of FIG. 11. Processing in each step of the flow chart of FIG. 11 is implemented by the CPU 201 by executing the VDP application 301 by controlling each module of the VDP application 301.

Figure 11:
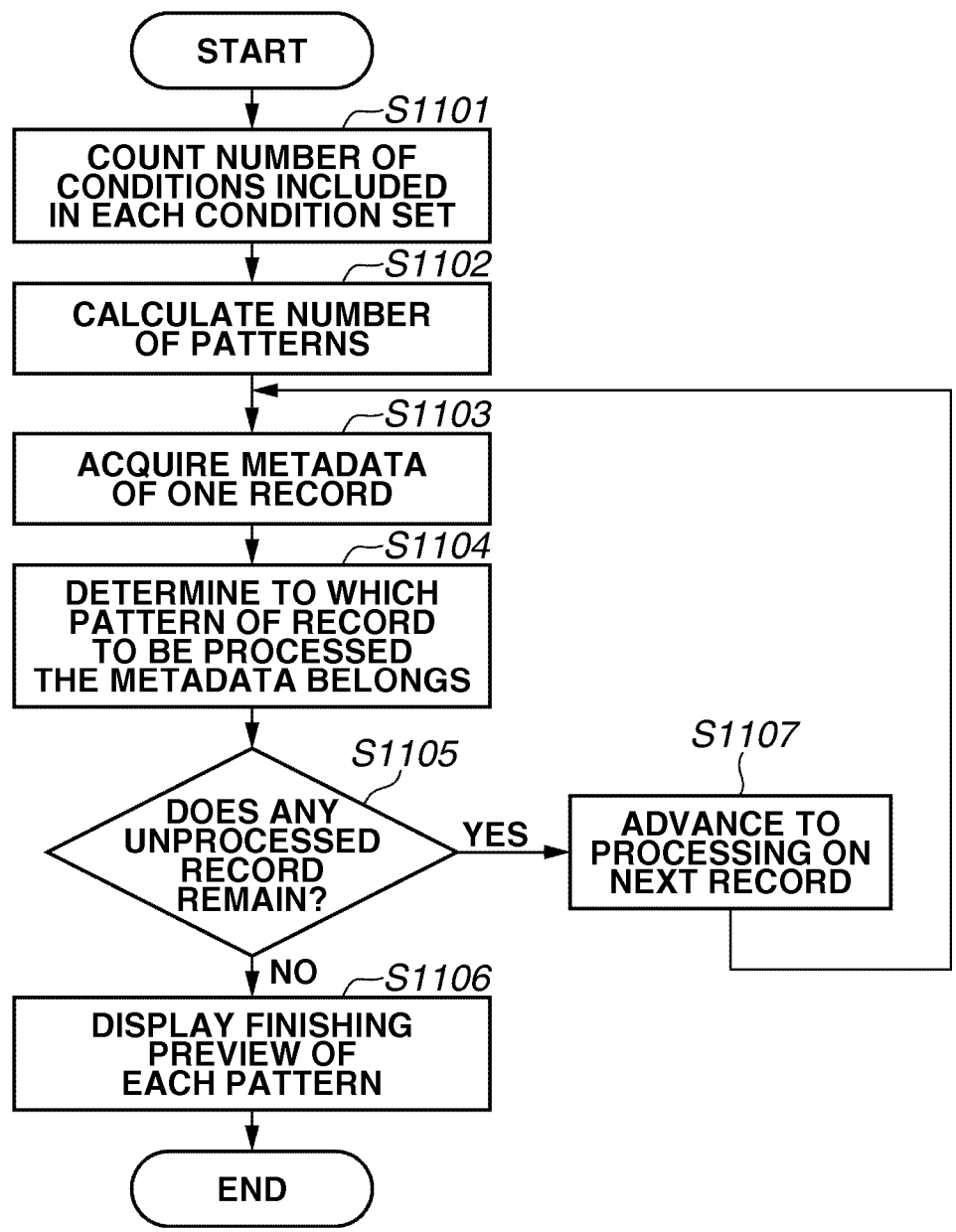
FIG. 11 is a flow chart illustrating an exemplary flow of quick preview processing.

Referring to FIG. 11, in step S1101, the print setting editing module 307 counts the number of conditions included in each condition set. More specifically, a condition set 1 illustrated in FIG. 9A includes three conditions including one IF statement, one ELSE IF statement, and one ELSE statement.

In step S1102, the print setting editing module 307 calculates the number of patterns of the print setting and extracts the content of each pattern. The number of the patterns can be calculated by multiplying the number of the conditions included in the condition sets. More specifically, if the condition set 1 includes three conditions and the condition set 2 includes two conditions, then 3×2=6 patterns exist. The print setting editing module 307 extracts the content of the patterns from the HDD 204 by the number of the patterns.

In step S1103, the print setting editing module 307 acquires the metadata of one record from the data source connection module 305 via the metadata editing module 306.

In step S1104, the print setting editing module 307 evaluates each condition for the metadata. More specifically, the print setting editing module 307 determines to which pattern, of the patterns extracted in step S1102, each condition belongs.

In step S1105, the print setting editing module 307 determines whether any unprocessed record exists. If it is determined that any unprocessed record exists (Yes in step S1105), then the processing advances to step S1107. On the other hand, if it is determined that no unprocessed record exists (No in step S1105), then the processing advances to step S1106. Accordingly, the print setting editing module 307 repeats the processing in steps S1103 through S1105 on each record until all the records are completely processed.

In the quick preview, it is useful if one record is previewed for each pattern. Accordingly, the print setting editing module 307 can determine whether a record included in all the patterns have been processed and if it is determined that a record included in all the patterns have been processed (Yes in step S1105), then the processing can advance to step S1106. With the above-described configuration, it becomes unnecessary to process all the records. Accordingly, the present exemplary embodiment can increase the processing speed.

In step S1106, the print setting editing module 307 displays the finishing image of each pattern on the field 805 in FIG. 8B via the UI module 302. In step S1107, the print setting editing module 307 proceeds to processing of a next record.

By executing the processing described above, it becomes necessary for the user only to verify the finishing state of one record for each available pattern of print settings. Accordingly, the present exemplary embodiment can save the user's trouble of having to verify finishing images of all the records.

<Addition of Product Intent Icon>

Figure 12:
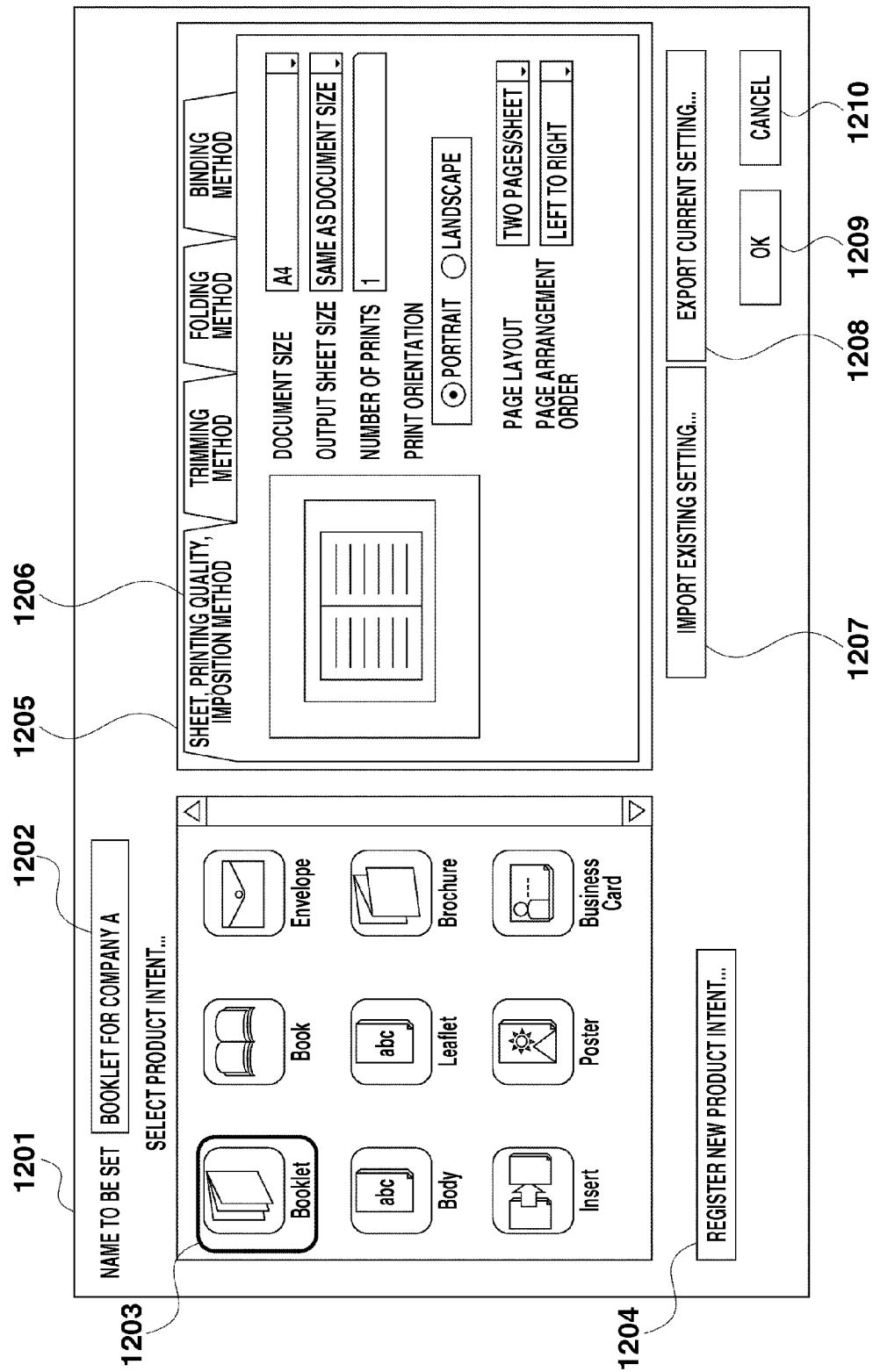
FIG. 12 illustrates an example of a Product Intent addition screen.

A screen for adding a Product Intent icon will be described in detail below with reference to FIG. 12. Referring to FIG. 12, the UI module 302 displays a Product Intent icon addition screen 1201. The UI module receives a name of a setting input by the user via a text box 1202. The UI module 302 receives designation of the Product Intent input by the user via a field 1203. A button 1204 can be pressed by the user to input an instruction to add a new Product Intent.

The UI module 302 displays a list of the Product Intents previously stored on the HDD 204 for the user to designate a Product Intent to be added. The UI module 302 adds the Product Intent designated by the user and displays the added Product Intent.

A field 1205 displays controls for receiving the print setting to the Product Intent designated by the user via the field 1203. Via a tab 1206, the UI module 302 receives an instruction to change the display of the print setting category input by the user. As illustrated in FIG. 5, because the available print setting categories differ according to the Product Intent, the content included in the tab 1206 may vary according to the Product Intent selected via the field 1203. When the user presses a button 1207, the UI module 302 receives an instruction to import the existing print setting stored on the HDD 204 input by the user. The UI module 302 reads the print setting designated by the user via the print setting editing module 307 and displays the read print setting in the field 1205.

When the user presses a button 1208, the UI module 302 receives an instruction to export the current setting to the HDD 204, which is input by the user. The UI module 302 stores the print setting set in the field 1205 on the HDD 204 via the print setting editing module 307. When the user presses a button 1209, the UI module 302 receives an instruction to finally set the print setting input by the user. The UI module 302 adds the Product Intent icon to the field 405 illustrated in FIG. 4 with the name designated via the control field 1202. The UI module 302 receives an instruction to cancel the designation for adding the Product Intent icon input by the user by operating a button 1210.

<Output of Job Ticket>

Figure 13:
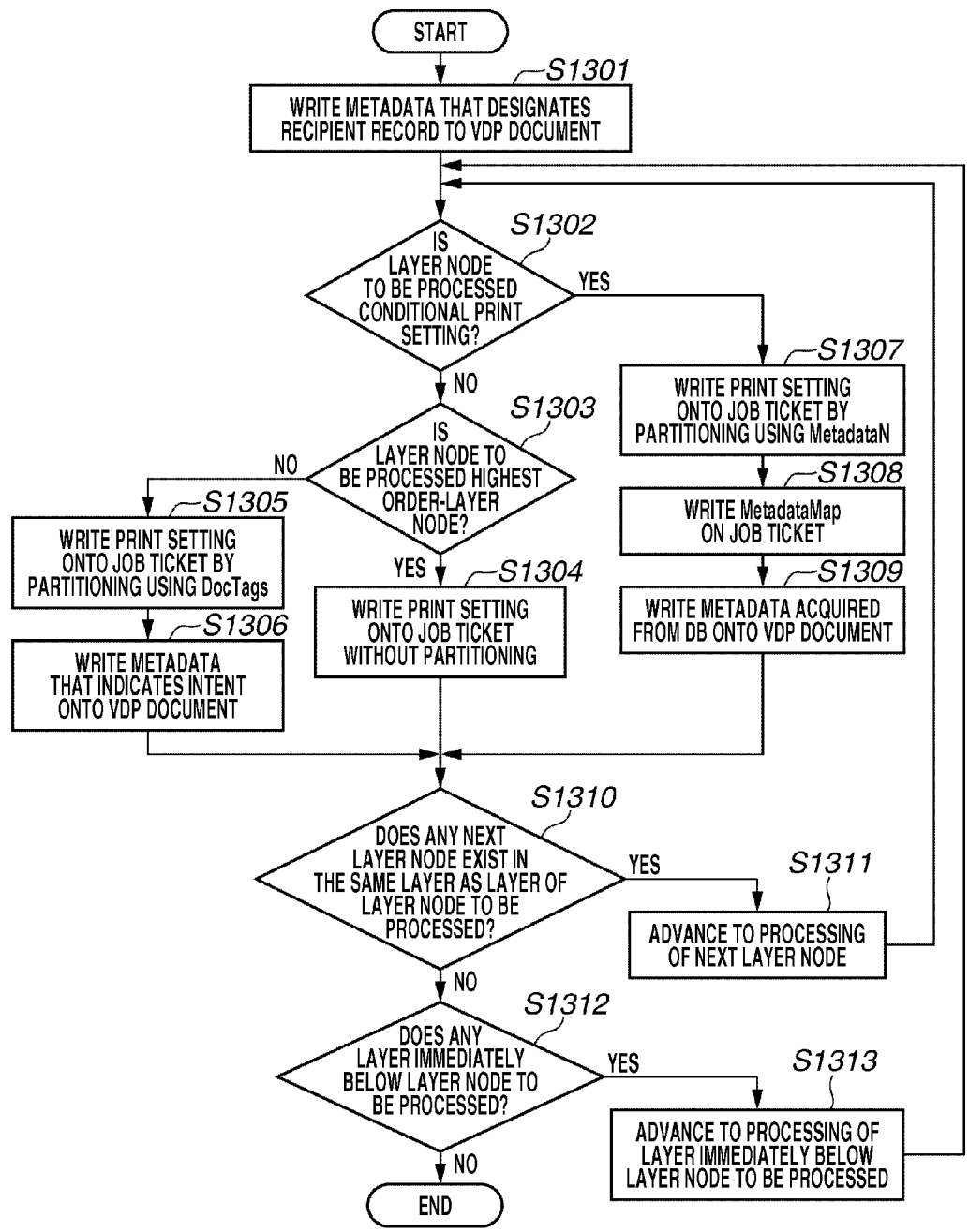
FIG. 13 is a flow chart illustrating an exemplary flow of processing for outputting a job ticket and a VDP document.

Now, processing for outputting a job ticket will be described in detail below with reference to FIG. 13. FIG. 13 is a flow chart illustrating an exemplary flow of processing for outputting a job ticket and for describing metadata for associating the VDP document and the job ticket in the VDP document.

In the present exemplary embodiment, it is supposed that the job ticket is described by JDF and the VDP document is described in PPML and PDF/VT.

Referring to FIG. 13, in step S1301, the metadata editing module 306 writes the metadata for designating a Recipient record into the VDP document.

Processing in steps S1302 through S1309 is processing for actually writing the print setting to the job ticket and for actually writing the metadata to the VDP document. More specifically, in processing in steps S1302 through S1309, starting from a highest-order layer node and down to lower-order layer nodes, the print setting is written into the job ticket and the metadata is written into the VDP document.

In step S1302, the job ticket output module 308 determines whether the layer node to be processed includes the conditional print setting. If it is determined that the layer node to be processed includes the conditional print setting (Yes instep S1302), then the processing advances to step S1307. On the other hand, if it is determined that the layer node to be processed does not include the conditional print setting, i.e., if it is determined that the layer node to be processed includes the basic print setting (No in step S1302), then the processing advances to step S1303.

In step S1303, the job ticket output module 308 determines whether the layer node to be processed is the highest-order layer node. If it is determined that the layer node to be processed is the highest-order layer node (Yes in step S1303), then the processing advances to step S1304. On the other hand, if it is determined that the layer node to be processed is not the highest-order layer node, i.e., if it is determined that the layer node to be processed is a layer node below the highest-order layer node (No instep S1303), then the processing advances to step S1305.

In step S1304, the job ticket output module 308 writes the print setting into the job ticket without executing partitioning. "Partitioning" is a concept of JDF and is a description method for classifying the print setting values in the unit of a job, document, page, or metadata. An example of the partitioning will be described in detail below with reference to FIG. 15A. If the layer node to be processed is the highest-order layer node, the print setting is set to the entire job. Accordingly, the job ticket output module 308 writes the print setting without executing partitioning.

In step S1305, the job ticket output module 308 writes the print setting into the job ticket with partitioning that uses Doc Tags. Doc Tags are variables for referring to a tag of the document embedded in the document to be processed (in the present exemplary embodiment, the VDP document). The Product Intent name is used as a value to be stored as the variable of DocTags in the present exemplary embodiment. An example of the Product Intent name will be described in detail below with reference to FIG. 15D. If the layer node to be processed is a layer node below the highest-order layer node, it is necessary to write a print setting limited to the layer. Accordingly, the job ticket output module 308 writes the print setting into the layer with using the partitioning.

In step S1306, the metadata editing module 306 writes the metadata into the layer of the VDP document that is equivalent to the layer node to be processed. The metadata editing module 306 writes the metadata including a key "Doc Type" having the value Product Intent name. An example of the metadata will be described in detail below with reference to FIG. 16C. By executing the processing up to step S1306, the document layer of the VDP document and the partition included in the job ticket are mutually associated.

In step S1307, the job ticket output module 308 writes the print setting into the job ticket using the partitioning that uses MetadataN. "MetadataN" collectively refers to variables that refer to metadata embedded in the document to be processed (the VDP document in the present exemplary embodiment).

In the specification of JDF 1.4, Metadata0 through Metadata9 is defined. By executing the partitioning that uses MetadataN, the print setting can be changed according to the value substituting the MetadataN. An example of the corresponding processing will be described in detail below with reference to FIG. 15B.

In step S1308, the job ticket output module 308 writes MetadataMap into the job ticket. "MetadataMap" is an element that defines mapping between the MetadataN, which is described in step S1307, and the metadata described in the VDP document. In the MetadataMap, a condition for the value of the metadata can be described. More specifically, description for substituting a specific value into the MetadataN if a specific condition is satisfied can be described in the MetadataMap. In the present exemplary embodiment, the condition of the conditional print setting, which is described above with reference to FIGS. 9A and 9B, is described, and the MetadataN is substituted with different values for different conditions. With the above-described configuration, the present exemplary embodiment can associate each condition of the value of the metadata with the print setting using the partitioning set in step S1307. An example of the corresponding processing will be described in detail below with reference to FIG. 15C.

In step S1309, the VDP job output module 304 writes the data acquired from the data source into the VDP document as the metadata. The metadata to be written can include all pieces of the data acquired from the data source. Alternatively, the metadata to be written can include the data referred to as the condition described in the MetadataMap in step S1308 only. The method for writing the metadata can be previously set in a setting file or can be designated by the user. An example of the metadata to be written will be described in detail below with reference to FIG. 16B.

In step S1310, the job ticket output module 308 determines whether a next layer node exists in the same layer as that of the layer node to be processed. If it is determined that the next layer node exists in the same layer as that of the layer node to be processed (Yes in step S1310), then the processing advances to step S1311, whereas if not (No in step S1310), the processing advances to step S1312.

In step S1311, the job ticket output module 308 advances to processing of the next layer node existing in the same layer as that of the layer node to be processed.

In step S1312, the job ticket output module 308 determines whether a layer immediately below the layer node to be processed exists. If it is determined that a layer immediately below the layer node to be processed exists (Yes in step S1312), then the processing advances to step S1313, whereas if not (No in step S1312), then the processing ends.

In step S1313, the job ticket output module 308 advances to processing of the layer immediately below the layer node to be processed.

As described above, the job ticket output module 308 writes the print setting into the job ticket and the metadata into the VDP document starting from the highest-order layer node and down to lower-order layer nodes. By executing the above-described processing, the present exemplary embodiment can output the job ticket to which the print setting to the layer and the conditional print setting have been set and the VDP document including the metadata.

Now, an image of the job ticket and the VDP document output when the print setting illustrated in FIG. 14 has been set to a specific document template will be described in detail below.

In the present exemplary embodiment, it is supposed that the job ticket is described by JDF. FIGS. 15A through 15D illustrate an image of the job ticket described by JDF.

In the present exemplary embodiment, it is supposed that the VDP document is described in PPML and PDF/VT. FIGS. 16A through 16C illustrate an image of the VDP document described in PPML. FIGS. 17A through 17C illustrate an image of the VDP document described in PDF/VT. Originally, the PDF/VT is a format based on PDF. However, in the present exemplary embodiment, it is supposed that the VDP document described in PDF/VT is described by a notation that uses XML. In the XML, for a name of an element that indicates the document layer of PDF/VT, a name that has been assigned to each layer of Dpart in the original PDF/VT document is used. The VDP document is described by the notation that uses the XML because XPath is used in referring to the PDF/VT metadata from JDF.

Figure 14:
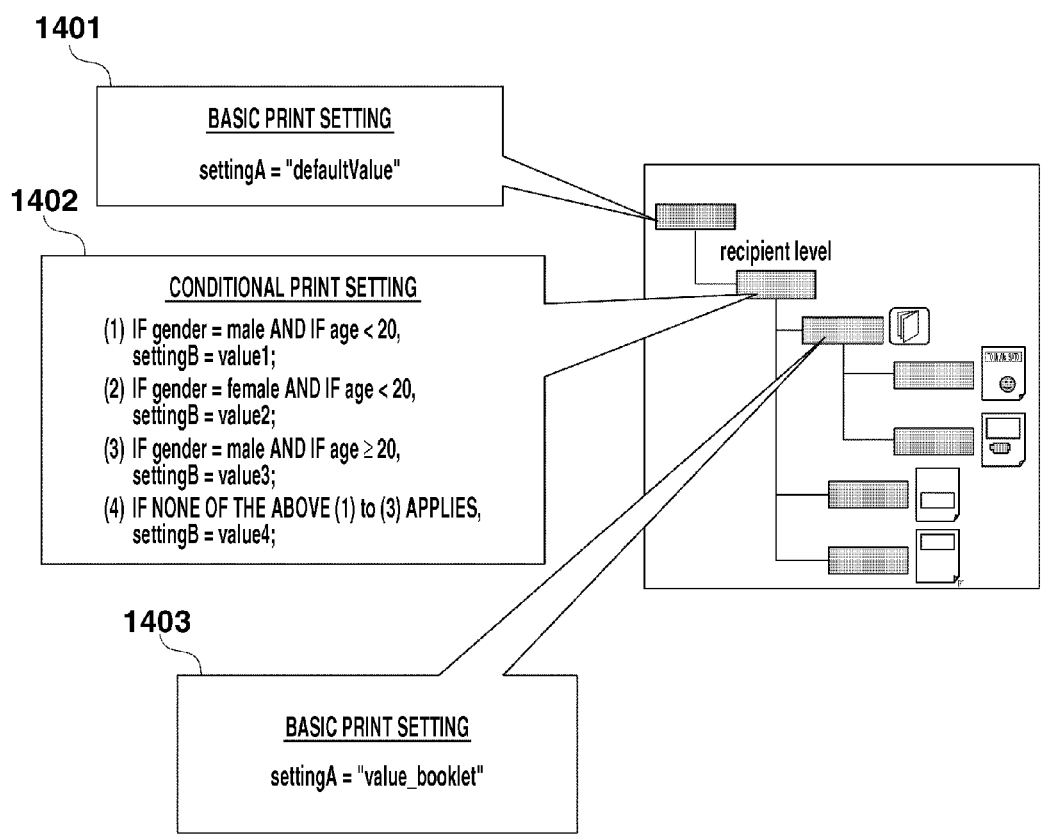
FIG. 14 schematically illustrates an example of a print setting.

FIG. 14 schematically illustrates an example of the print setting set to the document template. Referring to FIG. 14, a basic print setting 1401 is set to the highest-order layer node. For the basic print setting, a value "defaultValue" is set to a setting item "settingA".

Subsequently, the following conditional print settings 1402 are set to the second layer node.
(1) IF gender=male AND age<20, set "value1" to settingB;
(2) IF gender=female AND age<20, set "value2" to settingB;
(3) IF gender=male AND age 20, set "value3" to settingB;
(4) ELSE, set "value4" to settingB.

Lastly, a basic print setting 1403 for biding the first and the second image imposition blocks of the layer immediately below the layer of the conditional print setting 1402 as a booklet is executed. In the example illustrated in FIG. 14, a value "value_booklet" has been set as the value of the setting item settingA in the print setting.

When the above-described print setting is received from the user, at first, the processing in step S1301 is executed to describe metadata that indicates the Recipient Level is written in the VDP document. FIG. 16A illustrates an image of metadata 1601 that describes the Recipient Level added to the VDP document described in PPML. FIG. 17A illustrates an image of metadata 1701 that describes the Recipient Level added to the VDP document described in PDF/VT.

Thereafter, the processing in steps S1302 through S1312 is executed for each layer node. The processing is executed starting from the highest-order layer node of the document template.

At first, the processing on the basic print setting 1401 is executed. Because the basic print setting 1401 is set to the highest-order layer node, the processing in step S1304 is executed. Instep S1304, as indicated by a description 1501 illustrated in FIG. 15A, a description for setting a "defaultValue" to the settingA is written into the job ticket. As described above in the processing in step S1304, the print setting is written without using the partitioning.

Then, the processing advances to processing on a layer immediately below the highest-order layer node, and the processing on the conditional print setting 1402 is executed. Accordingly, the processing in steps S1307 through S1309 is executed.

In step S1307, the job ticket output module 308 writes the print setting into the job ticket using the partitioning that uses MetadataN. More specifically, descriptions 1502 are written. In the description 1502, "AAParams" is partitioned by a variable "Metadata0" (corresponding to "PartIDKey" defined by JDF). In this case, the setting value of the settingB is changed according to a value substituting the variable Metadata0. For example, if the Metadata0 has been substituted with a text string "Pattern1", then the value1 is set to the settingB.

In step S1308, the job ticket output module 308 writes MetadataMap into the job ticket. More specifically, the job ticket output module 308 writes the XPath to the metadata to be referred to and the condition for the metadata are written as indicated descriptions 1503 through 1506 illustrated in FIG. 15C. The description 1503 includes an instruction to substitute the variable "Metadata0" with a value "Pattern1" if the key "gender" of the metadata existing in "PPML/JOB/METADATA/DATUM/" has a value "male" and if the key "age" has a value "0-20". In the example illustrated in FIG. 15C, the XPath to the VDP document described in PPML has been designated. On the other hand, if the VDP document is described in PDF/VT, it is necessary to designate an XPath compliant with the hierarchical structure of the PDF/VT.

In the present exemplary embodiment, if the above-described conditions are satisfied, the variable "Metadata0" is substituted with the text string "Pattern1". In this case, when the user verifies the content of the description 1502 with a text editor or the like, the user cannot easily recognize which print setting is executed when each condition is satisfied. In order to prevent such an event, a text string that allows the user to easily recognize the condition corresponding to each print setting can be used as the text string substituting the variable Metadata0.

More specifically, instead of the text string "Pattern1", a text string such as "Gender=male_and_Age=0-20" can be used. With the above-described configuration, the present exemplary embodiment can allow the user to easily recognize which print setting is to be executed if each condition is satisfied by merely referring to the description 1502. Accordingly, the present exemplary embodiment can improve the human readability.

In step S1309, the VDP job output module 304 writes the data acquired from the data source into the VDP document as the metadata. More specifically, if the VDP document has been described in PPML, the metadata is written into the document layer equivalent to the layer to be processed, as illustrated in FIG. 16B by descriptions 1602 and 1603. If the VDP document has been described in PDF/VT, descriptions 1702 and 1703 illustrated in FIG. 17B are described. By executing the above-described processing, the description for setting the value1 to the settingB if the above-described condition is satisfied is included in the job ticket as well as the above-described descriptions 1502 through 1506.

Lastly, the layer immediately below the second highest-order layer is processed. In other words, the processing on the basic print setting 1403 is executed. The basic print setting 1403 is not a print setting to the highest-order layer node. Accordingly, the processing in steps S1305 and S1306 is executed.

In step S1305, the job ticket output module 308 writes the print setting into the job ticket with the partitioning that uses the DocTags. More specifically, descriptions 1507 through 1510 illustrated in FIG. 15D are written. Because a partition has been set differently to each condition in step S1307, the partition that uses the DocTags is described immediately below. In this case, if a text string "Booklet" is substituted in the DocTags, the value "value_booklet" is set to the print setting settingA. In the present exemplary embodiment, the text string "Booklet" is used which uses the Intent Type of the Product Intent that has been set. However, the text string used in the present exemplary embodiment is not limited to "IntentType". In other words, an arbitrary text string can be used.

In step S1306, the metadata editing module 306 writes the metadata that indicates the Intent into the VDP document. More specifically, the metadata including descriptions 1604 and 1605 illustrated in FIG. 16C are written into the document layer of the VDP document described in PPML, which is equivalent to the layer to be processed. On the other hand, the descriptions 1704 and 1705 illustrated in FIG. 17C are written into the VDP document described in PDF/VT. In the example illustrated in FIG. 17C, the metadata including the key "DocType" which has a value "booklet" is added to the VDP document. By executing the above-described processing, the print setting to the layer is executed using the descriptions 1507 through 1510 included in the job ticket described above.

As described above, the present invention can be implemented by the exemplary embodiment described above. However, the present invention is not limited to the above-described embodiment. In other words, the present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)). In this case, the program code itself which is read from the storage medium implements the functions of the embodiments described above, and accordingly, the storage medium storing the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-005833 filed Jan. 14, 2010, which is hereby incorporated by reference herein in its entirety.

What is claimed is:

1. An information processing apparatus for processing print data having a hierarchical structure, in which metadata can be added to layers in the hierarchical structure, the information processing apparatus comprising:
   a receiving unit configured to receive an instruction to mutually associate a layer included in a template corresponding to the print data and, print and output product definition information;
   a setting unit configured to execute a print setting corresponding to the print and output product definition information to the layer of the template according to the instruction received by the receiving unit;
   an output unit configured to output a job ticket including a correspondence relation between the print setting and the print data corresponding to the template to which the print setting has been set;
   an addition unit configured to add, to the print data, metadata for mutually associating the print setting described in the job ticket output by the output unit and a layer of the print data corresponding to a layer of the template to which the print setting has been set; and
   a determination unit configured to determine whether the print setting set to the layer of the template to be processed is a conditional print setting,
   wherein the output unit is configured, if it is determined by the determination unit that the set print setting is a conditional print setting, to refer to the metadata added to the print data and is configured to output a job ticket described in a format with which the print setting can be changed according to a value of the metadata that has been referred to.

2. The information processing apparatus according to claim 1, wherein a data source is associated with at least one layer of the layers included in the template.

3. The information processing apparatus according to claim 2,
   wherein the receiving unit is configured to receive a condition using data acquired from the data source which has been associated with the layer of the template, and an instruction to set a conditional print setting corresponding to the condition to the layer of the template, and
   wherein the setting unit is configured to set a print setting corresponding to the condition to the layer of the template.

4. The information processing apparatus according to claim 3, further comprising an acquisition unit configured to acquire data of the data source,
   wherein the addition unit is configured to add the data of the data source used in the condition to the layer of the template to which the conditional print setting has been set as metadata.

5. The information processing apparatus according to claim 1, further comprising a finishing state display unit configured to display a virtual finishing state of a print product which is acquired if the print setting set to the template is applied to print data corresponding to the template.

6. The information processing apparatus according to claim 5, further comprising an extraction unit configured to extract a pattern including a combination of print settings set by the setting unit to the template,
   wherein the finishing state display unit is configured to display a virtual finishing state of a print product which is acquired if the conditional print setting is applied to the print data of one record for each pattern extracted by the extraction unit.

7. The information processing apparatus according to claim 1, further comprising:
   a further addition unit configured to add the print and output product definition information; and
   a deletion unit configured to delete the print and output product definition information.

8. The information processing apparatus according to claim 1, wherein the job ticket is a job definition format (JDF) job ticket.

9. The information processing apparatus according to claim 1, wherein the print data is a variable data printing (VDP) document.

10. The information processing apparatus according to claim 9, wherein the VDP document is described in a portable document format variable and transactional (PDF/VT).

11. The information processing apparatus according to claim 9, wherein the VDP document is described in personalized print markup language (PPML).

12. A method for controlling an information processing apparatus configured to process print data having a hierarchical structure, in which metadata can be added to layers in the hierarchical structure, the method comprising:
   receiving an instruction to mutually associate a layer included in a template corresponding to the print data and, print and output product definition information;
   executing a print setting corresponding to the print and output product definition information to the layer of the template according to the received instruction;

outputting a job ticket including a correspondence relation between the print setting and the print data corresponding to the template to which the print setting has been set;

adding, to the print data, metadata for mutually associating the print setting described in the output job ticket and a layer of the print data corresponding to a layer of the template to which the print setting has been set;

determining whether the print setting set to the layer of the template to be processed is a conditional print setting;

referring to the metadata added to the print data if it is determined that the set print setting is a conditional print setting; and outputting a job ticket described in a format with which the print setting can be changed according to a value of the metadata that has been referred to.

13. The method according to claim 12, wherein a data source is associated with at least one layer of the layers included in the template.

14. The method according to claim 13, further comprising:
receiving a condition using data acquired from the data source which has been associated with the layer of the template, and an instruction to set a conditional print setting corresponding to the condition to the layer of the template; and setting a print setting corresponding to the condition to the layer of the template.

15. The method according to claim 14, further comprising:
acquiring data of the data source; and
adding the data of the data source used in the condition to the layer of the template to which the conditional print setting has been set as metadata.

16. The method according to claim 12, further comprising displaying a virtual finishing state of a print product which is acquired if the print setting set to the template is applied to print data corresponding to the template.

17. The method according to claim 16, further comprising:
extracting a pattern including a combination of print settings set to the template; and
displaying a virtual finishing state of a print product which is acquired if the conditional print setting is applied to the print data of one record for each extracted pattern.

18. A non-transitory computer-readable storage medium storing a program which, when executed by a computer, causes the computer to carry out the method of claim 12.

* * * * *